United States Patent
Eilam et al.

(10) Patent No.: US 8,074,218 B2
(45) Date of Patent: Dec. 6, 2011

(54) METHOD AND SYSTEM FOR CONSTRUCTING VIRTUAL RESOURCES

(75) Inventors: Tamar Eilam, New York, NY (US); Thomas R. Gissel, Apex, NC (US); Guerney Douglass Holloway Hunt, Yorktown Heights, NY (US); Alexander V. Konstantinou, New York, NY (US); Giovanni Pacifici, New York, NY (US); Hidayatullah Habeebullah Shaikh, Mohegan Lake, NY (US); Andrew Neil Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 11/693,397

(22) Filed: Mar. 29, 2007

(65) Prior Publication Data

US 2008/0244595 A1     Oct. 2, 2008

(51) Int. Cl.
*G06F 9/455* (2006.01)
*G06F 11/00* (2006.01)
*G06F 9/44* (2006.01)
*H03M 13/00* (2006.01)
*H03M 13/03* (2006.01)
*G11C 29/00* (2006.01)

(52) U.S. Cl. ............ 718/1; 714/746; 714/751; 714/764; 714/774; 714/786; 717/124; 717/125; 717/126; 717/127; 717/128

(58) Field of Classification Search .................... None
See application file for complete search history.

(56) References Cited

U.S. PATENT DOCUMENTS

| | | | | |
|---|---|---|---|---|
| 5,692,193 A * | 11/1997 | Jagannathan et al. | ........ | 718/106 |
| 7,263,596 B1 * | 8/2007 | Wideman et al. | ............ | 711/209 |
| 7,698,691 B2 * | 4/2010 | Chen et al. | .................... | 717/129 |
| 7,774,446 B2 * | 8/2010 | Nedelcu et al. | ............... | 709/223 |
| 7,804,947 B2 * | 9/2010 | Brown et al. | ........... | 379/201.12 |
| 2004/0225952 A1 | 11/2004 | Brown et al. | | |
| 2005/0177600 A1 | 8/2005 | Eilam et al. | | |
| 2005/0198244 A1 | 9/2005 | Eilam et al. | | |
| 2006/0005181 A1 | 1/2006 | Fellenstein et al. | | |
| 2006/0074618 A1 | 4/2006 | Miller et al. | | |
| 2006/0195848 A1 * | 8/2006 | Arndt et al. | ................... | 718/104 |
| 2007/0043860 A1 * | 2/2007 | Pabari | ........................... | 709/224 |
| 2007/0050770 A1 * | 3/2007 | Geisinger | ..................... | 718/100 |
| 2007/0156861 A1 * | 7/2007 | Nedelcu et al. | ............... | 709/220 |
| 2007/0250833 A1 * | 10/2007 | Araujo et al. | ..................... | 718/1 |
| 2008/0028058 A1 * | 1/2008 | Shaw et al. | ................... | 709/223 |

(Continued)

OTHER PUBLICATIONS

Sapuntzakis et al., "Virtual Appliances for Deploying and Maintaining Software", Proceedings of the 17th Large Installation systems Administration Conference (LISA 2003), USENIX Association, pp. 181-194, Oct. 26-31, 2003. http://www.usenix.org/events/lisa2003/tech/full_papers/sapuntzakis/sapuntzakis.pdf.

(Continued)

*Primary Examiner* — Emerson Puente
*Assistant Examiner* — Adam Lee
(74) *Attorney, Agent, or Firm* — Yee & Associates, P.C.; Preston J. Young

(57) ABSTRACT

System for managing a life cycle of a virtual resource. One or more virtual resources are defined. The one or more defined virtual resources are created. The created virtual resources are instantiated. Then, a topology of a virtual resource is constructed using a plurality of virtual resources that are in at least one of a defined, a created, or an instantiated state.

20 Claims, 19 Drawing Sheets

U.S. PATENT DOCUMENTS

2008/0163210 A1* 7/2008 Bowman et al. .................. 718/1
2008/0195756 A1* 8/2008 Galles .......................... 709/245

OTHER PUBLICATIONS

VGrADS Annual Report 2005, Rice University http://vgrads.rice.edu/foundations/annual_reports/vgrads-2005/attach/previewPopup.

Janakiraman et al., "Automated Multi-Tier System Design for Service Availability", HP Laboratories, HPL-2003-109, published in First Workshop on Design of Self-Managing Systems (at DSN 2003) Jun. 2003, pp. 1-23.

Vuletic et al., "Seamless Hardware-Software Integration in Reconfigurable Computing Systems", IEEE Design and test of Computers, pp. 102-113, Mar.-Apr. 2005. http://lapwww.epfl.ch/publications/VuleticMar05_SeamlessHardwareSoftwareIntegrationInReconfigurableComputingSystems_IEEEDTC.pdf.

"Computing at the Edge", White Paper, Sun Microsystems, Inc., 2003, pp. 1-36. http://www.sun.com/software/grid/whitepaper.edge.pdf.

"AutonomicComputing: Enabling Self-Managing Solutions", V1.0, IBM, Whitepaper, Dec. 2005, pp. 1-16. http://www-03.ibm.com/autonomic/pdfs/SOA_and_Autonomic_Computing.pdf.

Eilam et al., "Reducing the Complexity of Application Deployment in Large Data Centers", Integrated Network Management, 2005, 9th IFIP/IEEE International Symposium on IM, May 15-19, 2005 pp. 221-234.

Eilam et al., "Managing the Configuration Complexity of Distributed Applications in Internet Data Centers", IEEE Communications Magazine, Mar. 2006, pp. 1-13.

* cited by examiner

METHOD AND SYSTEM FOR CONSTRUCTING VIRTUAL RESOURCES

BACKGROUND OF THE INVENTION

1. Field of the Invention

The present invention relates generally to an improved data processing system. More specifically, the present invention is directed to a computer implemented method, system, and computer usable program code for constructing virtual resources.

2. Description of the Related Art

Today, most businesses rely on complex information technology (IT) infrastructure for day to day operations. A user, such as a system administrator or operator, may manage this complex IT infrastructure by, for example, installing software, configuring firewalls, and updating software by installing patches. Managing this complex IT infrastructure requires flexibility and agility based on the need of the business. However, the total cost of ownership of complex IT infrastructures is continuously increasing. Analysts attribute this increasing cost to several factors, such as heterogeneity of resources, large scale, complex software, and network interdependencies, that cut across layers and hosting environments.

To address these increasing cost challenges, businesses are beginning to adopt virtualization technologies, such as, for example, VMware, which is virtualization software available from VMware, Inc., Palo Alto, Calif. and XEN, which is open source virtualization software. Such virtualization technologies enable a user to seamlessly partition resources of a single physical machine into multiple virtual machines. Each virtual machine runs its own operating system (OS) and software stack. Thus, virtualization technology may relieve businesses from dealing with different types of hardware and OSs and the associated costs. Also, this virtualization technology may allow businesses to better utilize resources of physical machines or containers without jeopardizing isolation and security or creating unnecessary dependencies and complexities.

While this virtualization technology may eliminate dependencies on hardware and OSs, deploying a solution, which is composed of multiple components, on an OS container is still a complex and laborious task due to the many interdependencies that exist between software products and due to poor consumability of software products. Consequently, it has been proposed to combine virtualization technology with a solution appliance, which is also known as a virtual resource. A virtual resource is a resource that provides a well-defined set of functions. A virtual resource may be internally composed of multiple components that are configured together to achieve a higher level function.

However, there are no good methodologies or tools available today to fulfill the vision of utilizing virtual resources to radically simplify IT management. By leveraging virtualization technologies, such as VMware and XEN, users are able to freeze dry an entire stack of software components, which are then re-instantiated on different physical machines or hosts. But, no good method currently exists to create the initial stack of software components, to instantiate this stack of software components with different input parameters or identities, or to combine several of these software component stacks into a single virtual resource that may be managed as easily as a single software component stack.

Therefore, it would be beneficial to have an improved computer implemented method, system, and computer usable program code for constructing virtual resources.

SUMMARY OF THE INVENTION

Illustrative embodiments provide a computer implemented method, system, and computer usable program code for managing a life cycle of a virtual resource. One or more virtual resources are defined. The one or more defined virtual resources are created. The created virtual resources are instantiated. Then, a topology of a virtual resource is constructed using a plurality of virtual resources that are in at least one of a defined, a created, or an instantiated state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
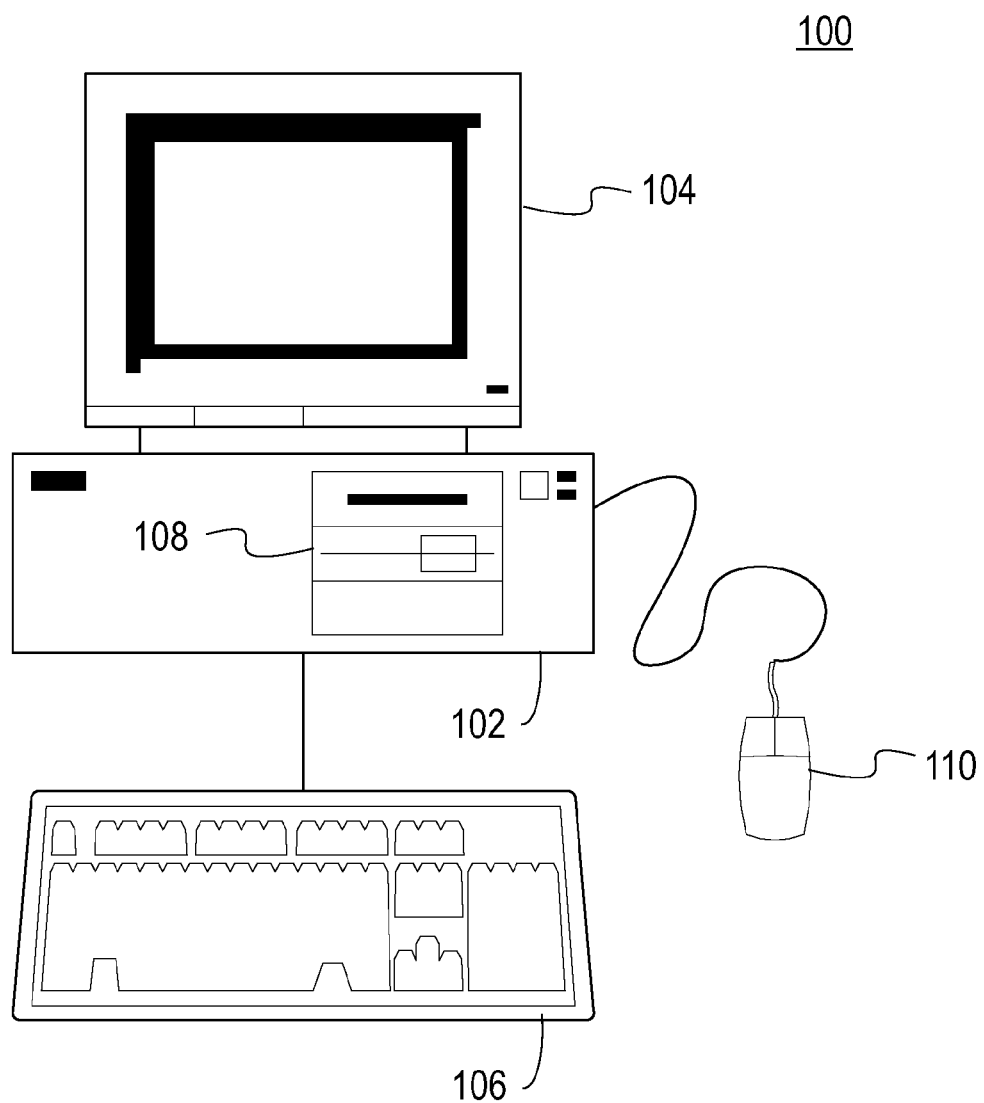
FIG. 1 is a pictorial representation of a data processing system in which illustrative embodiments may be implemented.
Figure 2:
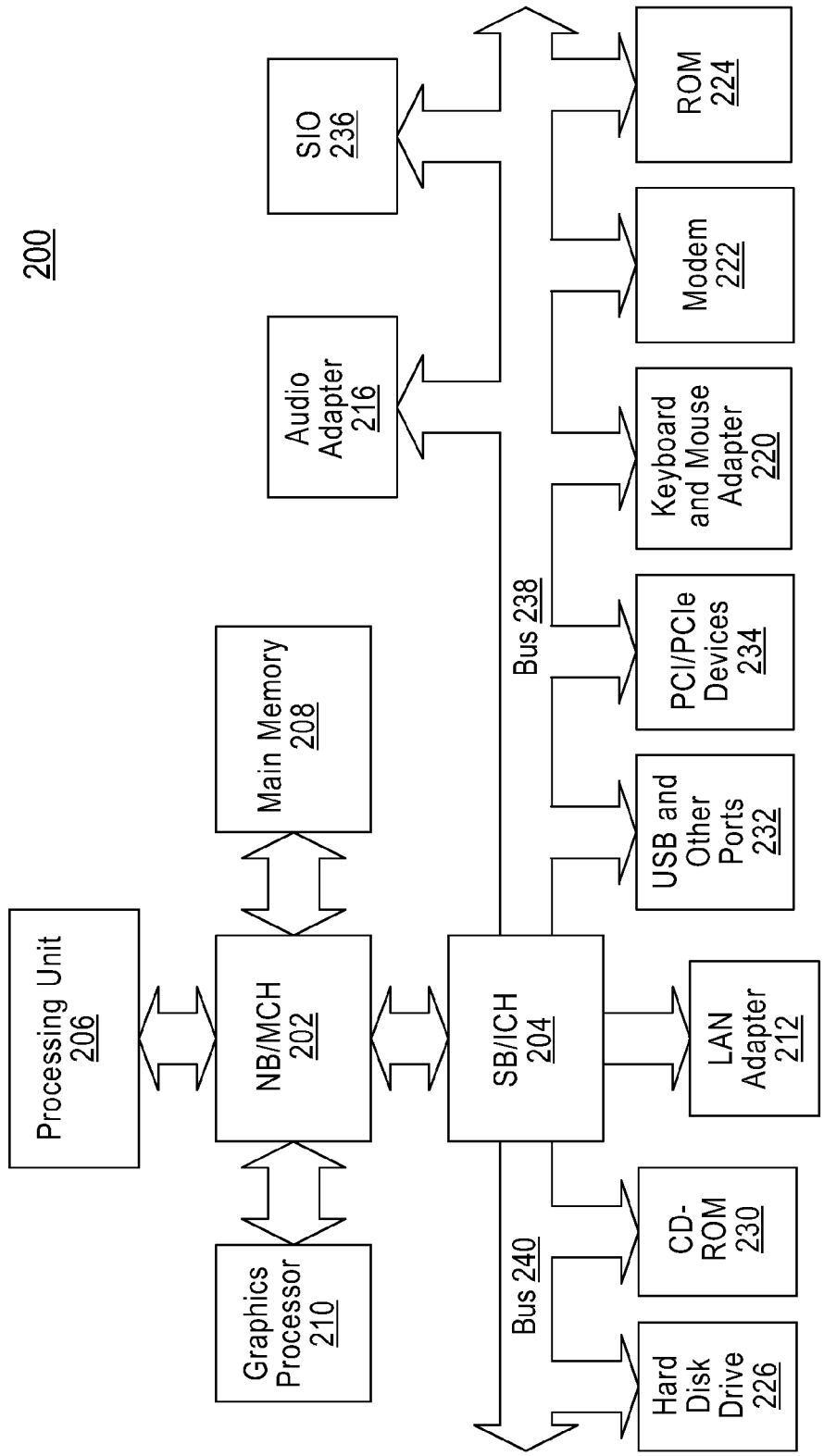
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to FIG. 1, a pictorial representation of a data processing system is depicted in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

With reference now to FIG. 2, a block diagram of a data processing system is shown in which illustrative embodiments may be implemented. Data processing system 200 is an example of a computer, such as computer 100 in FIG. 1, in which computer usable program code or instructions implementing processes for illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to NB/MCH 202. Processing unit 206 may contain one or more processors and even may be implemented using one or more heterogeneous processor systems. Graphics processor 210 may be coupled to NB/MCH 202 through an accelerated graphics port (AGP), for example.

In the depicted example, local area network (LAN) adapter 212 is coupled to SB/ICH 204 and audio adapter 216, keyboard and mouse adapter 220, modem 222, read only memory (ROM) 224, universal serial bus (USB) and other ports 232, and PCI/PCIe devices 234 are coupled to SB/ICH 204 through bus 238, and hard disk drive (HDD) 226 and CD-ROM 230 are coupled to SB/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM 230 may use, for example, an integrated drive electronics (IDE) or serial advanced technology attachment (SATA) interface. A super I/O (SIO) device 236 may be coupled to SB/ICH 204.

An OS runs on processing unit 206 and coordinates and provides control of various components within data processing system 200 in FIG. 2. The OS may be a commercially available OS such as Microsoft® Windows® XP. Microsoft and Windows are trademarks of Microsoft Corporation in the United States, other countries, or both. An object oriented programming system, such as the Java™ programming system, may run in conjunction with the OS and provides calls to the OS from Java™ programs or applications executing on data processing system 200. Java™ and all Java™-based trademarks are trademarks of Sun Microsystems, Inc. in the United States, other countries, or both.

Instructions for the OS, the object-oriented programming system, and applications or programs are located on storage devices, such as HDD 226, and may be loaded into main memory 208 for execution by processing unit 206. Processes of illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to, or in place of, the hardware depicted in FIGS. 1-2. Also, processes of illustrative embodiments may be applied to a multiprocessor data processing system.

In some illustrative examples, data processing system 200 may be a personal digital assistant (PDA), which is generally configured with flash memory to provide non-volatile memory for storing OS files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communications unit may include one or more devices used to transmit and receive data, such as modem 222 or network adapter 212. A memory may be, for example, main memory 208 or a cache, such as found in NB/MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for managing a life cycle of a virtual resource. A user utilizing a data processing system defines one or more virtual resources. Then, the user may create the one or more defined virtual resources. After creating the one or more defined virtual resources, the user may instantiate the created virtual resources. Subsequently, the user may construct a topology of a virtual resource using a plurality of virtual resources, which the plurality of virtual resources may be in a defined state, a created state, or an instantiated state.

A virtual resource is a resource that provides a well-defined set of functions that may be easily instantiated, started, stopped, and connected with other resources, virtual or not. A virtual resource may be internally composed of multiple components that are configured together to achieve a higher level function. In particular, virtual resources may span multiple OSs and hardware containers. The user of the virtual resource does not have to be aware of the internal structure of the virtual resource. The virtual resource exposes an abstraction that allows a user to manage this complex structure as easily as a basic, unbreakable, base resource.

A base resource is a software module, such as Websphere application server. The software module is associated with an installation mechanism, such as InstallShield, and with an installation artifact, such as an RPM file. A provisioning automation technology, such as Tivoli Provisioning Manager, allows for process automation of base resource installation.

A new virtual resource definition may include the following actions that may be performed in any order: 1) Create a template topology that includes the components of the virtual resource and how they are connected together; 2) Define capabilities and requirements that are exposed; 3) Optionally, define what in the topology is fixed and what may be changed; 4) Optionally, sub-categorize this metadata as modifiable at construction time and at runtime; 5) Define user inputs; 6) Define environment inputs; 7) Select a subset of validation and resolution rules, which are inherited from the sub-components that are enabled; 8) Add new validation and resolution rules, if necessary; 9) Define logical links that are exposed; 10) Optionally, define an icon to visually represent the newly created resource; 11) Define configuration scripts, if necessary; and 12) Package and store the definition.

Creating a virtual resource means creating an image or a set of images that are the embodiment of the virtual resource definition. The topology that is part of the virtual resource definition represents the desired structure of software components in a single or multiple software stacks and their configuration. The provisioning automation technology provides the ability to author and execute automation workflows that describe a sequence of low level resource management steps needed to accomplish a certain goal.

In addition, the provisioning automation technology provides the ability to automatically generate a workflow based on a declarative desired model state, such as the desired model state that is created by a virtual resource design tool. The workflow generated will bring the system from its current state to the desired state that is described in the model. For the purpose of creating an image, a sequence of steps may be coded into a workflow. It should be noted that the workflow receives as a parameter the topology that is part of the virtual resource definition. Once the workflow is executed, the result is automatic creation of the image(s).

Model driven technologies, such as, for example, the Rainforest project, use object relationship models and model transformation techniques in order to plan changes in the deployment and configuration of software and networks. Resources, such as, software and networks, are described as units. Each unit has a type, such as, for example, WebsphereServerUnit, DataSourceUnit, or WindowsOSUnit. Each Unit is associated with a set of capabilities and requirements. Each capability contains a set of attribute value pairs that describe the properties of the resource. Requirements may contain expressions that describe what is expected of the properties of other related resources. There are three types of capabilities and requirements: hosting, dependency, and membership.

Units, capabilities, and requirements all may be connected via relationships. There are three basic types of relationships: hosting, dependency, and membership. A hosting relationship connects two units. A hosting relationship is valid if all of the hosting requirements of the relationship's source are satisfied by the set of hosting capabilities of the relationship's target. A dependency relationship connects a single dependency requirement with a single capability, which may be a hosting type or a dependency type. Dependency requirements indicate that a certain value of a property of a resource is derived from a property of another resource. Each dependency relationship is associated with logic to calculate the value of a derived property based on the properties of the resource that is the target of the dependency. Last, membership links define containment constraints, such as multiplicity, between group units and the set of elements that the group units contain.

In addition to the models, the technology allows a user to associate validation and resolution rules with resource types. A validation rule defines further constraints that must hold on topologies that contain instances of the corresponding type. These constraints may go beyond the ones implied by the associated set of requirements. An example of a simple constraint on an attribute values is: "DB2 password must be 8 characters." The deployment planning framework triggers and evaluates the relevant validation rules for every change in the topology. Resolution rules are associated with error markers generated by validation rules evaluated to False. A resolution rule contains model transformation logic to fix an error marker. For example, a resolution rule for an unsatisfied hosting requirement for a unit may search for a different unit with suitable hosting capabilities and connect the two units via a hosting relationship. The deployment planning technology is extensible such that new unit types may be defined with capabilities and associated requirements. New validation and resolution rules may be added and associated with new or existing resources.

Illustrative embodiments allows users to construct topologies by discovering and representing existing resources in a data center as model elements, such as units and relationships, and adding to the topology units representing new resources, such as software modules to be installed, or a new configuration, such as a data source, and connecting the units with relationships that indicate placement and dependencies. Illustrative embodiments include a model resolution controller that executes all of the relevant validation rules following every model change. Units for which validation rules failed are marked with error markers. Users may execute resolution rules that are associated with errors, if they exist. Resolution rules, once executed, change the model by adding or changing model elements. These model changes trigger another validation cycle. Illustrative embodiments provide a flexible line between manual and automatic modes of topology constructions. In other words, users may allow illustrative embodiments to automatically execute a sequence of resolution rules to obtain a topology, or sub-topology, which is fully resolved with no error markers present.

A virtual resource designer is a user that defines new virtual resource types or new validation and resolution rules. A topology designer is a user that utilizes resource definitions in order to construct new topologies. While virtual resource design is currently laborious and requires domain knowledge and modeling/programming skills, illustrative embodiments provide a system for easily constructing valid topologies. Illustrative embodiments seamlessly incorporate the virtual resource definitions to present the right set of options for the topology designer to create a topology.

Topologies may be constructed in an automatic or a semi-automatic mode. The end result of the topology planning phase is a fully valid topology where: 1) all of the requirements of units (hosting, dependency and membership) are satisfied; 2) all of the validation rules associated with units in the topology evaluate to True; and 3) all of the validation rules associates with logical links are evaluated to True. A fully valid topology describes a configuration state that is functional and all of the high level goals expressed by the logical links are obtained. The fully valid topology is detailed enough to serve as a blueprint and plan for provisioning automation. The provisioning automation technology may consume this fully valid topology and automate provisioning, deployment, and configuration of resources based on the topology.

The provisioning automation technology is an extensible workflow based automation technology. The provisioning automation technology comes with a set of automation packages for automating particular tasks, such as, for example, installation of a software module and configuration of a switch. Users may contribute new automation packages or author end-to-end workflows that use the automation packages to perform larger tasks. The provisioning automation technology also includes a model driven automation function. This model driven automation function consumes a fully valid model generated by a topology planning tool and uses the fully valid model in order to automate provisioning. At the end of the process, the state of the data center matches what is described in the topology. In the process, software is installed and started, configuration is created on servers, applications are deployed into respective containers, et cetera.

Instantiating a virtual resource requires running automatic resolution based on user inputs and the selection of virtual machines. The result of instantiating a virtual resource may change the model in various places. This may serve as input to execution of image fixup scripts. These image fixup scripts are executed as part of the image startup and are responsible to make the necessary changes in the configuration of software components. These changes are necessary as the software components were configured with respect to different input and environment variables. The virtual resource design tool, using the automatic resolution function, may provide the input to the image fixup scripts, which are basically derived from the fully valid topology.

Once virtual resources are running, the topology designer may apply changes driven by the topology planning tool. In particular, new relationships may be created between objects representing virtual resources in any state. The topology designer draws a logical link between two objects representing two running virtual resources. The topology is automatically refined resulting in one or multiple topology objects representing required configuration on one or more virtual resources in order to support the communication intent specified by the relationships. This is no different then the resolution of the logical link as part of the process of defining a new virtual resource. It should be noted that these changes are conducted on a physical model and may or may not be exposed to the user. The physical model is a fully resolved topology, where some of the objects represent resources in an instantiated state and some of the objects represent new configuration that needs to be created on the resources.

The provisioning automation technology is called with the fully valid topology as an input. The workflow for the fully valid topology may be executed to drive the change in configuration. This function does not care if the target software components are running on a virtual or non virtual server or how they were created. It should be noted that there are multiple obvious variations of illustrative embodiments. For example, the topology planning tool may be used to build a topology that includes objects representing resources in multiple states, such as instantiated, created, and defined.

It is straight forward to see how the building blocks of a topology may be used to automate the change based on the topology specification. An example sequence is: 1) the topology is fully resolved; 2) for each object representing a resource in a defined state, an image is created; 3) all resources in a created state are instantiated; and 4) if resources exist whose configurations do not match their description in the topology, the change is automated as described above.

Thus, illustrative embodiments provide a way to fulfill the promise of virtual resources. Illustrative embodiments provide a model driven, declarative, recursive, and scalable method to define virtual resources that may be used to drive automatic life cycle management of these resources. Driven by the definition of the virtual resource, illustrative embodiments automatically instantiate, start, stop, and connect virtual resources. A key value of illustrative embodiments is that the life cycle of all virtual resources is uniform. This means that the user is unaware of the internal structure of the new virtual resource, which is a very complex structure that includes multiple components and may span multiple containers, and may be managed with the same ease of a basic resource or a simple virtual resource. Virtual resources uniformly manifest how they may be connected with other resources (virtual or not).

Illustrative embodiments provide a system for: 1) easily defining new virtual resources leveraging existing definitions of base or virtual resources; 2) constructing a network of virtual resources and relationships that specify the communication requirements between these resources; and 3) automatically managing the life cycle of virtual resources including instantiation and configuration based on the definition of the virtual resources and the network specifying the connectivity requirements.

Figure 3:
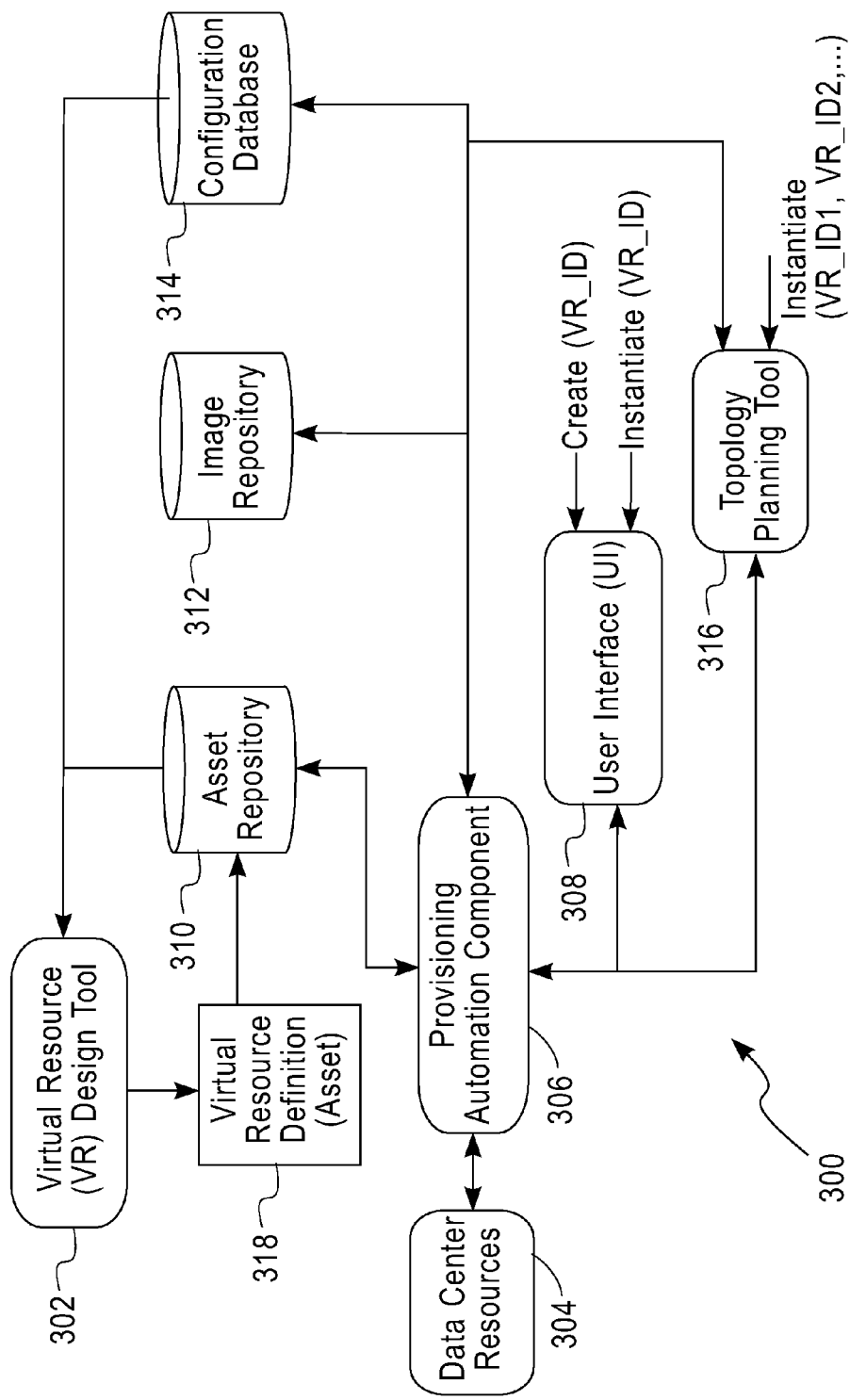
FIG. 3 is a block diagram of an exemplary data processing system architecture for definition and life cycle management of virtual resources in accordance with an illustrative embodiment.

With reference now to FIG. 3, a block diagram of an exemplary data processing system architecture for definition and life cycle management of virtual resources is depicted in accordance with an illustrative embodiment. Data processing system 300 may, for example, be computer 100 in FIG. 1. Data processing system 300 includes virtual resource design tool 302, data center resources 304, provisioning automation component 306, user interface 308, asset repository 310, image repository 312, configuration database 314, and topology planning tool 316.

Virtual resource design tool 302 is a tool that allows a virtual resource designer to define a new virtual resource. In order to define a virtual resource a virtual resource designer creates a template topology that defines components that comprise the virtual resource, how the components of the virtual resource are connected together, and how the components may be changed. The virtual resource components may be changed when the virtual resource is instantiated, when the virtual resource is connected to other resources at runtime, or when the virtual resource is used as a component to compose a larger virtual resource. In addition, the virtual resource designer defines what capabilities, requirements, logical links, and inputs are exposed to users of the virtual resource.

The virtual resource designer uses existing definitions of base resources, which may be found in data center resources 304, to create definitions for the new virtual resources. Data center resources 304 may include both base resources and instantiated virtual resources. By default, all validation and resolution rules associated with the base resource definitions are inherited by the new virtual resource definitions. However, the virtual resource designer may decide to disable, or override, some of the existing validation and resolution rules with new rules for the new virtual resource. The virtual resource designer may decide on a subset of base resource capabilities that are exposed by the new virtual resource. At the end of the process for defining the virtual resource, all information regarding the virtual resource is packaged as an asset, such as virtual resource definition (asset) 318, and stored in asset repository 310. Virtual resource definition (asset) 318 includes: topology of the virtual resource definition; exposed set of capabilities, requirements, logical links, and input parameter values; and the validation and resolution rules. Asset repository 310 is a non-volatile storage unit for storing definitions of base and virtual resources.

Once the virtual resource designer generates the virtual resource definition, the virtual resource designer may create the virtual resource from the virtual resource definition. The virtual resource designer uses provisioning automation component 306 to create the virtual resource. When the virtual resource designer creates a virtual resource, the virtual resource designer uses the definition, such as virtual resource definition 318, as input into provisioning automation component 306 to automatically construct a single, or a set of, freeze dried stack(s) captured as a set of images, such as, for example, VMware images. If virtual resource definition 318 includes a topology with multiple OSs, then provisioning automation component 306 creates an image with the freeze dried stack based on a sub-topology corresponding to each of the OSs.

The virtual resource designer triggers the "create" operation from user interface 308. User interface 308 may, for example, be a simple user interface. The virtual resource designer may provide inputs, such as, for example, an identification (ID) for virtual resource definition 318 that resides in asset repository 310 and input parameters for creation, into provisioning automation component 306 from user interface 308. The resulting set of created virtual resource images are stored in non-volatile image repository 312. Virtual resource definition 318 within asset repository 310 is updated with references, such as, for example, a file system path, to the created virtual resource images within image repository 312.

Configuration database 314 may, for example, maintain the associations between the virtual resource definitions within asset repository 310 and the created virtual resources within image repository 312. In addition, configuration database 314 may maintain data representing the current state of data center 304. The data representing the current state of data center 304 may, for example, include how servers and virtual machines are configured. The configuration data may be in any suitable model, such as an object oriented model.

It should be noted that the virtual resource designer may use virtual resource definition 318 to create multiple alternative sets of created virtual resource images. The virtual resource designer may require these multiple alternative sets of created virtual resource images to create images that correspond to different input parameters or to create several types of images, such as, for example, XEN or VMware. The virtual resource designer may use each alternative set of created virtual resource images to instantiate the virtual resource.

Once the virtual resource designer creates the virtual resource images, the virtual resource designer may instantiate the virtual resource. To instantiate a virtual resource, the virtual resource designer is prompted to provide the input parameter values through user interface 308. User interface 308 provides the input parameters that the virtual resource designer used to create the virtual resource image as default input parameters, which the virtual resource designer may override. If there are multiple alternative sets of created images available, then the virtual resource designer may select between the multiple alternative sets, such as, for example, based on a preferred imaging technology. The result of this instantiation step is a running functional virtual resource, which is configured in correspondence with the input parameter values. It should be noted that the virtual resource designer may independently instantiate a virtual resource multiple times on different or the same set of physical resources.

In addition, a topology designer may instantiate a network of virtual resources. The topology designer may use topology planning tool 316 to select a set of virtual resources that are either in a defined, created, or instantiated state to create the network of virtual resources. The topology designer uses topology planning tool 316 to create logical links between the set of virtual resources based on the definitions of the set of virtual resources. Also, the topology designer uses topology planning tool 316 to provision the entire network of virtual resources as a single action. Provisioning automation component 306 consumes the network of virtual resources topology, which was constructed by the topology designer with the aid of topology planning tool 316, to automate the provisioning process. Topology planning tool 316 uses the virtual resource definitions to offer to the topology designer a set of valid options for selection of virtual resources, input parameter values, and creation of logical links.

Moreover, using the resolution rules that are packaged with the definition of each virtual resource, a template topology is automatically refined to a fully resolved topology that contains enough detail to automate the provisioning/instantiation process. To keep satisfying the abstraction/encapsulation key property of virtual resources, topology planning tool 316 represents each virtual resource as a single opaque object, which includes the associated set of capabilities and requirements. This representation of each virtual resource as a single opaque object is the same visual representation of base resources. Topology planning tool 316 keeps the detailed model, which includes the internal structure of each virtual resource, hidden from the user. The detailed model is automatically refined and transformed based on the topology designer's selection and by executing the resolution rules that are part of the virtual resource's definition. Provisioning automation component 306 consumes the detailed model to automate the provisioning process.

It should be noted that the topology constructed by the topology designer may include virtual resources that are defined but not created (i.e., created images do not exist), created but not instantiated, instantiated, or any combination thereof. For instantiated virtual resources, provisioning automation component 306 does not again instantiate the virtual resources but uses, and possibly automatically configures, the instances to support new connectivity requests. Also, it should be noted that connecting two instantiated resources is a special case of this description.

Figure 4:
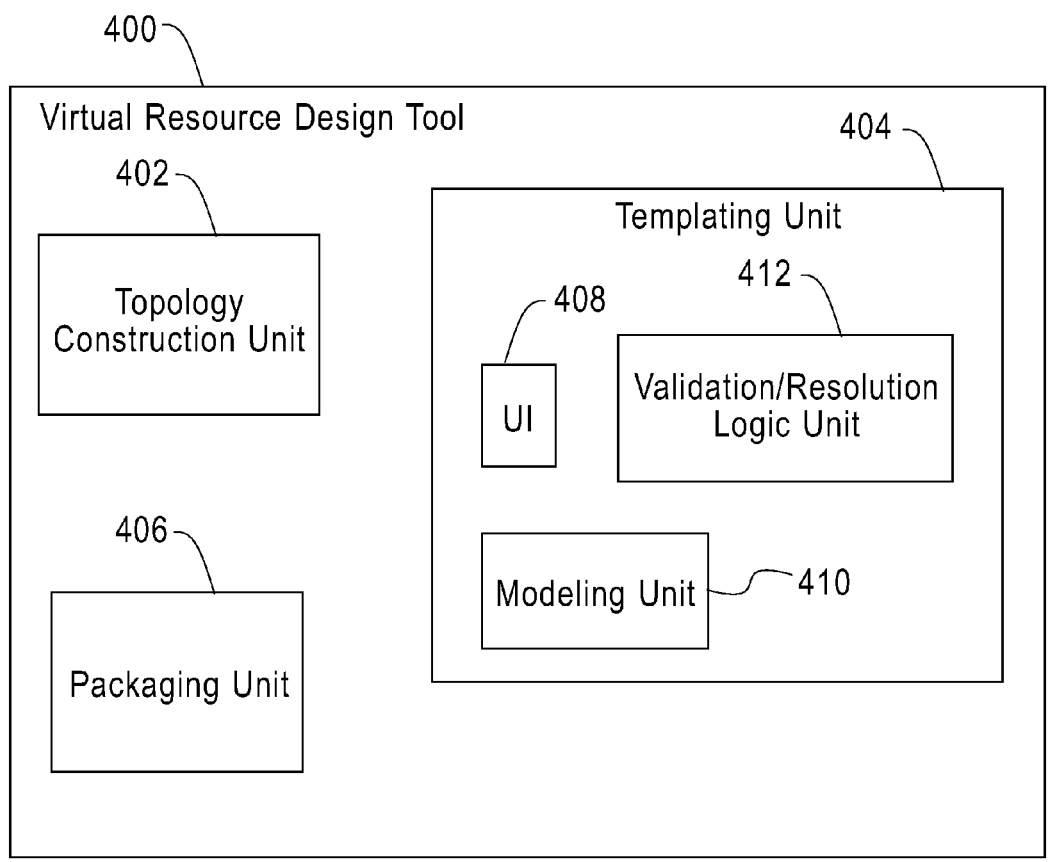
FIG. 4 is a block diagram of components of a virtual resource design tool in accordance with an illustrative embodiment.

With reference now to FIG. 4, a block diagram of components of a virtual resource design tool is depicted in accordance with an illustrative embodiment. Virtual resource design tool 400 may, for example, be virtual resource design tool 302 in FIG. 3. Virtual resource design tool 400 provides a virtual resource designer with the ability to easily define a new virtual resource. The new virtual resource definition is based on existing definitions from either virtual or base resources, which include associated metadata, models, and validation and resolution rules. Other components of the data processing system, such as, for example, provisioning automation component 306 and topology planning tool 316 within data processing system 300 in FIG. 3, use these new virtual resource definitions to enable creation of a virtual resource, instantiation of the virtual resource, and connection of other resources to the virtual resource. Further, these new virtual resource definitions enable correct construction of a network of virtual resources and auto-construction of a detailed model of the network of virtual resources, which is needed to provision the entire structure.

Virtual resource design tool 400 includes topology construction unit 402, templating unit 404, and packaging unit 406. Topology construction unit 402 is a deployment planning technology, such as, for example, Rainforest. Topology construction unit 402 allows the virtual resource designer to construct a topology for the new virtual resource definition.

Templating unit 404 provides the ability to encapsulate a sub-topology and expose only a sub-set of the capabilities. Templating unit 404 includes user interface 408, modeling unit 410, and validation/resolution logic unit 412. User interface 408 provides the virtual resource designer with the ability to create a collapsible group, add members to or expand a group, and associate capabilities and requirements with a group. By utilizing user interface 408, the virtual resource designer may, for example, place checkmarks within check boxes that enumerate a list of capabilities, requirements, and attributes in the sub-topology and enumerate a list of elements to be exposed at the virtual resource level. In addition, the virtual resource designer may use user interface 408 to create new capabilities and associate new or existing attributes at the virtual resource level.

Furthermore, the virtual resource designer may employ user interface 408 to specify which validation and resolution rules and logical links to expose at the virtual resource level. This also may be done by using checkboxes. In other words, user interface 408 may present the virtual resource designer with a list of validation and resolution rules and logical links associated with each of the contained resources, which the virtual resource designer may checkmark for inclusion at the virtual resource level. User interface 408 may obtain this list by, for example, introspecting the definition of these resources.

Another user interface 408 function may, for example, allow the virtual resource designer to annotate each of the elements in the sub-topology with some keywords, such as, for example, FIXED. These keywords may, for example, impose constraints on how and when the internal structure of the virtual resource may change. Illustrative embodiments may easily implement this function using technologies, such as, for example, Eclipse.

Modeling unit 410 is able to represent the structure of the model constructed by the virtual resource designer based on user interface 408 inputs. One way to represent the structure of the model is to represent each of the base resource definitions in XML Schema language. If illustrative embodiments use, for example, the Rainforest deployment planning technology as a basis, then the base resource definition is already captured in the XML Schema language.

What needs to be added to the captured base resource definition is another definition type that represents the virtual resource, which includes the new group unit and any new capabilities and requirements, if any. In addition, the association between the new group unit, the new group unit's capabilities and requirements, and the sub-topology included in the new group unit may be kept in an XML instance file. The virtual resource designer may easily auto-generate these artifacts based on specific inputs within user interface 408.

The virtual resource designer utilizes validation/resolution logic unit 412 to choose which of the current set of validation and resolution rules should be inherited from the base resource definitions. Moreover, the virtual resource designer may use validation/resolution logic unit 412 to create another set of validation and resolution rules to take care of the association between an exposed capability and the internal copy that the exposed capability represents. In particular, the model represents an exposed capability as yet another capability instance.

In order to enforce the association between the exposed capability instance and the internal copy that the exposed capability actually represents, validation/resolution logic unit 412 creates a new validation rule and a new resolution rule. The new validation rule states that the set of attributes in both capabilities must be equal. The new resolution rule propagates the values from the exposed capability instance to the internal copy that the exposed capability actually represents.

It should be noted that validation/resolution logic unit 412 may use a similar mechanism to handle a newly exposed capability that aggregates a set of input attributes, which are copies of attributes in a set of capabilities in the resource's internal structure. Further, it should be noted that validation/resolution logic unit 412 may implement the validation and resolution rules as Java™ code that manipulates the model through EMF interfaces. Validation/resolution logic unit 412 may automatically generate this Java™ code based on the virtual resource designer's resource specification inputs within user interface 408.

Another validation/resolution logic unit 412 function is the ability to expose any logical link between two contained resources at the virtual resource level. A wizard within user interface 408 allows the virtual resource designer to make this logical link selection. Based on the selection, validation/resolution logic unit 412 may automatically generate a new XML schema definition to represent the new logical link between the associated virtual resource types.

Then, validation/resolution logic unit 412 applies all validation and resolution rules that are associated with the original logical link. Validation/resolution logic unit 412 may do this by generating new Java™ code to represent new validation and resolution rules that basically call, or delegate, to the original rules. Validation/resolution logic unit 412 also may do this through inheritance, delegation at a different level, or just reusing the original rules by coping. In all of these cases, validation/resolution logic unit 412 may again automatically generate the Java™ code based on the virtual resource designer's selections within user interface 408.

Virtual resource design tool 400 may, for example, allow the virtual resource designer to select an icon to represent the new virtual resource definition by utilizing user interface 408. Virtual resource design tool 400 uses packaging unit 406 to package all of this information into a virtual resource definition, such as, for example, virtual resource definition 318 in FIG. 3. The package may, for example, be an Eclipse plug-in. All of this packaged information in the virtual resource definition includes the XML Schema files, the XML instance files, the icon, and the validation and resolution rules associated with the new virtual resource definition. Subsequently, virtual resource design tool 400 stores this virtual resource definition (asset) in an asset repository, such as, for example, asset repository 310 in FIG. 3.

Figure 5:
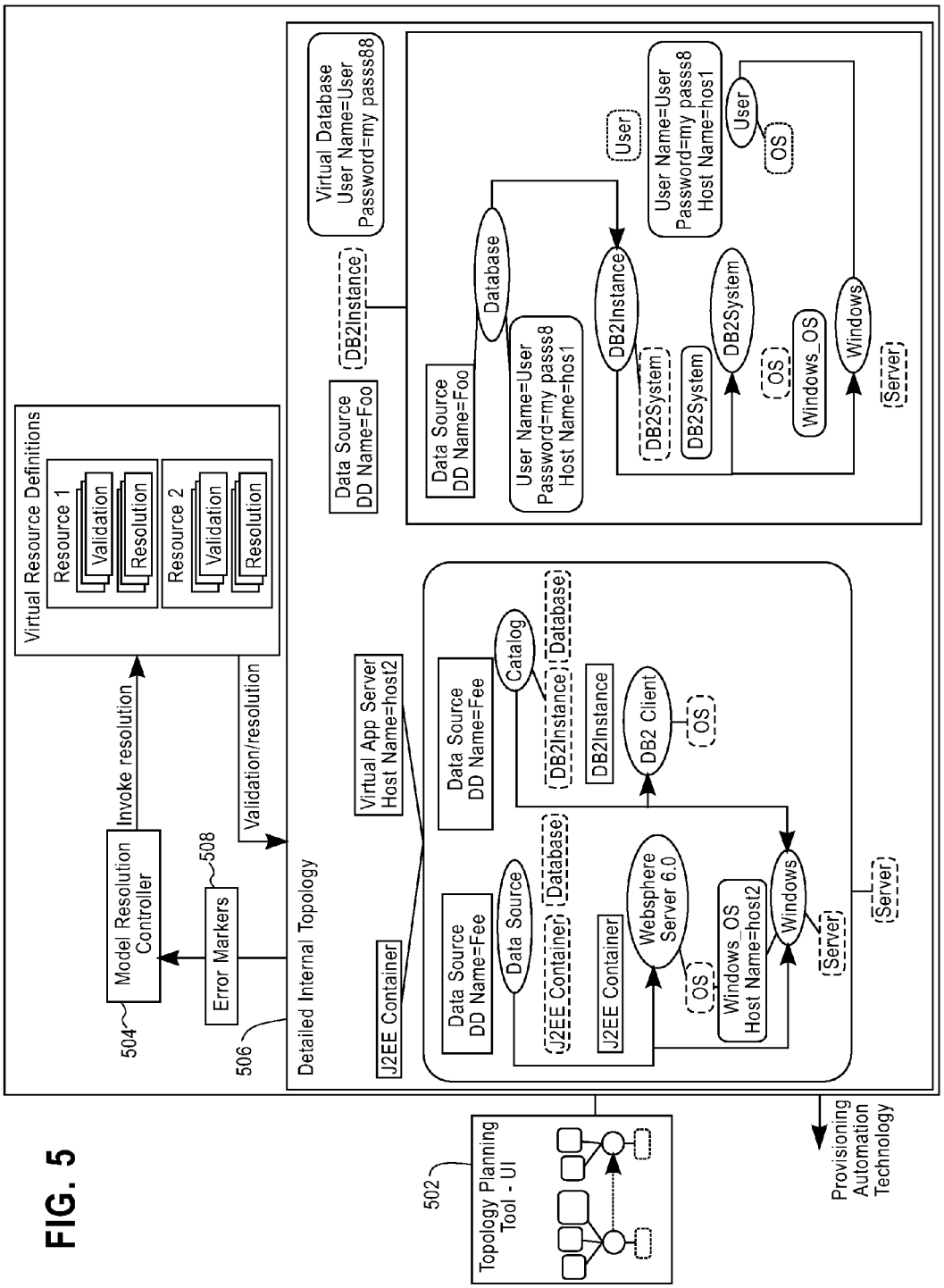
FIG. 5 is a block diagram of components of a topology planning tool in accordance with an illustrative embodiment.

With reference now to FIG. 5, a block diagram of components of a topology planning tool is depicted in accordance with an illustrative embodiment. Topology planning tool 500 may, for example, be topology planning tool 316 in FIG. 3. Topology planning tool 500 includes user interface 502, model resolution controller 504, and detailed internal topology 506. However, it should be noted that topology planning tool 500 may include any necessary components to perform processes of illustrative embodiments.

Topology planning tool 500 allows a topology designer to construct virtual resource topologies from virtual resources, which may be in a defined, created, or instantiated state. Topology planning tool 500 presents the topology designer with a simplified view of each virtual resource, which may, for example, be represented as a single opaque object within user interface 502. User interface 502 may, for example, be user interface 308 in FIG. 3. The topology designer may create virtual resource topologies within user interface 502 by, for example, using a mouse to drag and drop defined, created, or instantiated resources into the topology. In addition, the topology designer may create relationships, such as logical links, between resources and specify input parameter values for resources that are in a defined or a created state within user interface 502.

Topology planning tool 500 keeps internally detailed internal topology (model) 506. Detailed internal topology 506 includes the internal structure of all of the virtual resources associated with the topology of the virtual resource. Topology planning tool 500 updates detailed internal topology (model) 506 based on the topology constructed by the topology designer. In particular, whenever the topology designer specifies an input parameter, draws a logical link between resources, or draws a hosting link between resources, topology planning tool 500 automatically invokes all relevant resolution rules to change detailed internal topology 506 in accordance with the topology designer's specification model inputs within user interface 502.

At the end of the process, if the topology designer specified all of the required input parameters, then the topology is consistent and contains enough details for a provisioning automation technology, such as, for example, provisioning automation component 306 in FIG. 3, to realize the required changes by instantiating the virtual resource and/or changing the configuration of the virtual resource. Topology planning tool 500 may read input from several different locations. For example, topology planning tool 500 may read input on resource definitions obtained from an asset repository, such as asset repository 310 in FIG. 3. This input read from the asset repository may, for example, be in the form of downloadable Eclipse plug-ins. Topology planning tool 500 may obtain input on existing resource instances from a configuration database, such as, for example, configuration database 314 in FIG. 3. Management of this configuration database maintains an association between instantiated virtual resources, or containers, and the instantiated virtual resources associated virtual resource definitions.

Topology planning tool 500 is similar to a deployment planning technology, such as, for example, Rainforest. As previously mentioned above, for every change in detailed internal topology (model) 506, topology planning tool 500 triggers all relevant validation rules. Validation rules may create error markers, such as, for example, error markers 508, which are associated with resolution rules. Remember, that the virtual resource designer in the virtual resource definition stage already included all necessary information within each of the virtual resource definition packages, such as, for example, virtual resource definition package 318 in FIG. 3. In particular, the virtual resource designer associates validation and resolution rules with virtual resources and logical links. Topology planning tool 500 triggers these validation rules whenever the topology designer makes a change in a virtual resource topology. Presenting error markers 508 to the topology designer will not do any good. Error markers 508 refer to detailed internal topology (model) 506. Topology planning tool 500 presents the topology designer with a simplified topology or model, which is in a much coarser granularity than detailed internal topology 506. In particular, topology planning tool 500 presents every resource as a single opaque object.

Topology planning tool 500 fixes error markers 508 by automatically triggering the resolution rules associated with these error markers. Topology planning tool 500 utilizes model resolution controller 504 to perform these error marker fixes. Error markers 508, which are generated by the execution of the validation rules, provide input into model resolution controller 504. Error markers 508 reference detailed internal topology 506, which topology planning tool 500 keeps internally. Model resolution controller 504 executes all resolution rules associated with the error markers generated by the validation step.

It should be noted that there are at least two types of resolution rules: 1) propagation resolution rules and 2) logical link resolution rules. Illustrative embodiments may employ several algorithms to implement model resolution controller 504. For example, illustrative embodiments may use a simple algorithm that iteratively invokes resolution rules until all addressable error markers are fixed or disappear. It should be noted that some resolution rules may have the affect of eliminating several error markers at one time, while other resolution rules may have the affect of changing the topology in such a way as to create new error markers that are associated with new resolution rules.

A more sophisticated algorithm may try different options of resolution rules or resolution rules in different orders in a search process in order to get to a valid topology state. However, it should be noted that some error markers may not be resolved until the provisioning automation technology instantiates the virtual resource. This type of error marker, which is not resolved until the virtual resource is instantiated, is related to the requirements of the virtual resource on the physical environment. More specifically, the topology designer may specify a physical hosting environment and create the appropriate hosting links to construct a fully valid topology. Alternatively, the topology designer may allow the provisioning automation technology to automatically select a suitable hosting environment at instantiation time based on the requirements specifications of the virtual resource.

Figure 6:
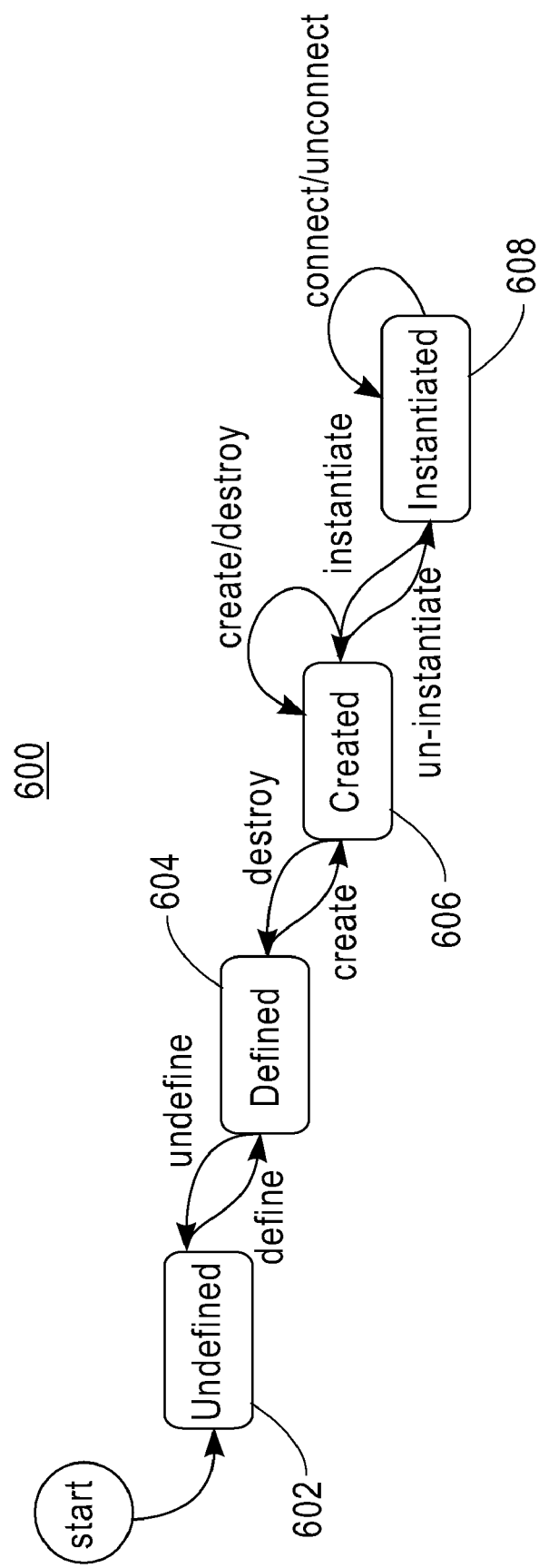
FIG. 6 is an exemplary illustration of life cycle states of a virtual resource in accordance with an illustrative embodiment.

With reference now to FIG. 6, an exemplary illustration of life cycle states of a virtual resource is depicted in accordance with an illustrative embodiment. Virtual resource life cycle 600 includes undefined virtual resource state 602, defined virtual resource state 604, created virtual resource state 606, and instantiated virtual resource state 608. Undefined virtual resource state 602 is a virtual resource that is not defined. Defined virtual resource state 604 is a virtual resource that is defined, such as, for example, virtual resource definition 318 in FIG. 3. It should be noted that a user may change the state of a virtual resource, either up or down the life cycle state chain, as needed.

Defined virtual resource state 604 is stored in an asset repository, such as, for example, asset repository 310 in FIG. 3. Defined virtual resource state 604 may be used to create new virtual resources. Created virtual resource state 606 is a virtual resource that is created. Created virtual resource state 606 adds references to a set of images to defined virtual resource state 604. Multiple images may be associated with a single virtual resource definition. These one or more images may be based on a different technology or different default inputs. Created virtual resource state 606 is stored in an image repository, such as, for example, image repository 312 in FIG. 3.

Instantiated virtual resource state 608 is a virtual resource that is instantiated. Created virtual resource state 606, which is stored in the image repository, is instantiated and correctly configured based on user and environment inputs. Instantiated virtual resource state 608 is a functional virtual resource and is stored in a data center, such as data center 304 in FIG. 3, along with other base and virtual resources. It should be noted that while instantiated virtual resources are running, the running instantiated virtual resources may be connected to or unconnected from other resources.

Figure 7:
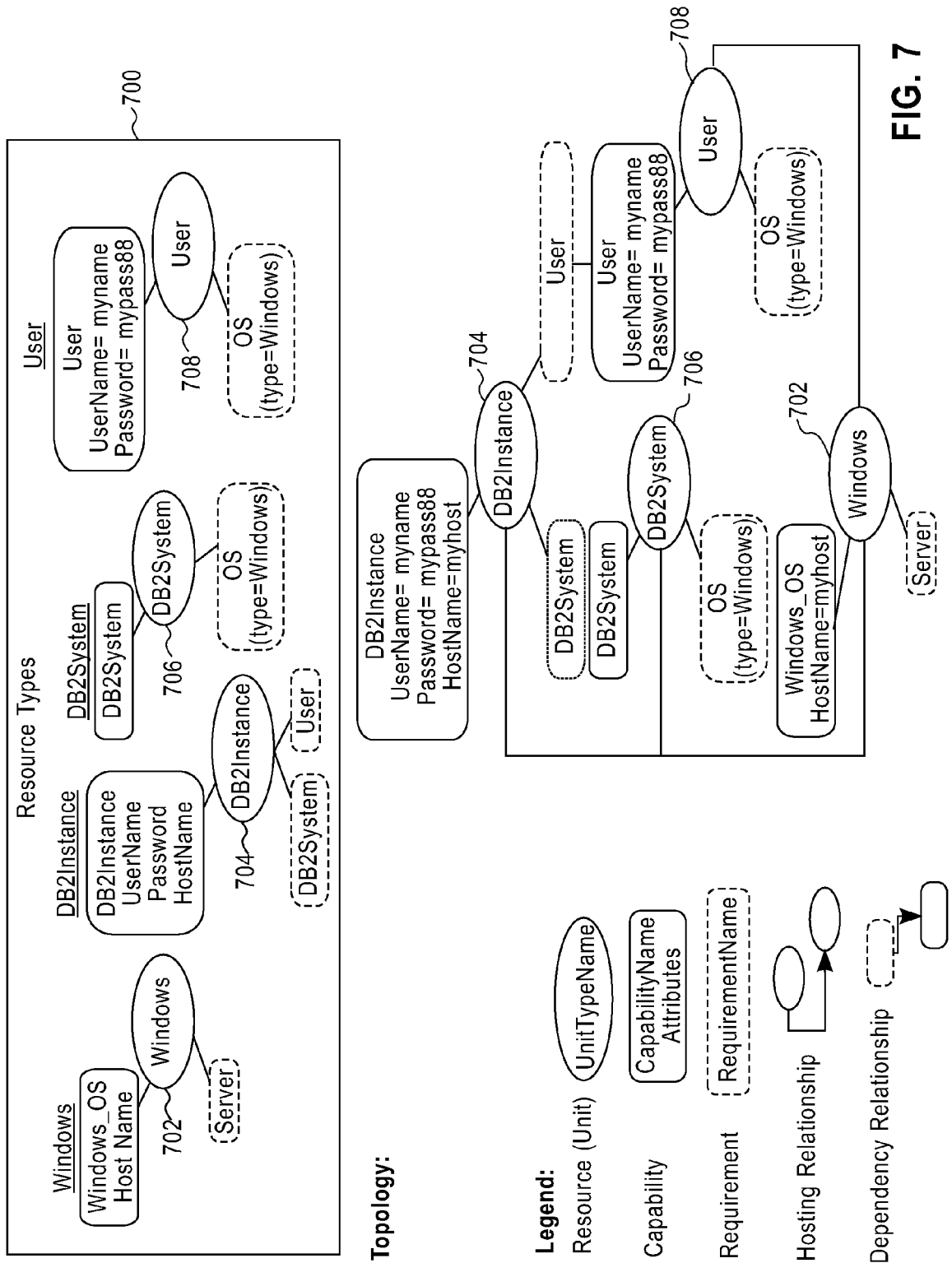
FIG. 7 is an illustration of four exemplary resources in accordance with an illustrative embodiment.

With reference now to FIG. 7, an illustration of four exemplary resources is depicted in accordance with an illustrative embodiment. Resource types 700 are resources that may be used to make new virtual resource definitions. Resource types 700 includes Windows 702, DB2Instance 704, DB2System 706, and User 708. However, it should be noted that illustrative embodiments may include more or fewer resource types to accomplish processes of the illustrative embodiments.

Windows 702, DB2Instance 704, DB2System 706, and User 708 are each resources. Windows 702, DB2Instance 704, DB2System 706, and User 708 are each associated with a set of capabilities and a set of requirements. The capabilities contain attribute definitions that are properties of the resource. Some of these properties, such as, for example, user name and password on User 708, are configurable.

The definitions for Windows 702, DB2Instance 704, DB2System 706, and User 708 may have associated validation and resolution rules. For example, a validation rule for DB2Instance 704 may be that the password must be at least 8 characters in length. Another exemplary validation rule may be that the username and password defined on DB2Instance 704 must match the username and password defined on User 708 that hosts DB2Instance 704 recursively. An associated resolution rule will propagate the value of the username and password attributes based on a dependency link from DB2Instance 704 to User 708. If such a dependency link does not exist between DB2Instance 704 and User 708, then the resolution rule may, for example, prompt the topology designer for an input for a username and password. Based on these inputs from the topology designer, the resolution rule may automatically insert into the topology the topology designer's definition, the hosting link to User 708, and the dependency link from DB2Instance 704, and only then propagate the values. Another exemplary validation rule may be that the host name defined on DB2Instance 704 must match the host name defined on User 708. Again, the associated resolution rule propagates the value of the host name by traversing hosting links in the topology.

In addition, virtual resource designers may raise the level of abstraction in constructing topologies based on higher level goals by defining configuration patterns. A configuration pattern is a statement of a goal, such as, for example, communication, and model transformation logic to achieve this goal. For example, a virtual resource designer may define a new type of logical link between two existing resource types, such as Windows 702 and DB2System 706. Connecting instances of Windows 702 and DB2System 706 by a logical link is a statement of a communication goal.

A number of conditions must be met in order for a goal to be considered satisfied. These conditions may, for example, include configuration on the instances at the end of the link or configuration on software modules down the hosting stacks. The details of the required configuration may depend on the global state of the topology. The associated validation rule checks to see if the goal is satisfied by the current topology. If the goal is not satisfied by the current topology, then an error marker, such as, for example, error marker 508 in FIG. 5, is created. The associated resolution rule offers an automatic way to transform the current topology in such a way as to satisfy the goal. For example, based on the global state of the topology, the resolution rule may decide to add resources or units representing the necessary configuration to achieve the goal on both sides of the software stack.

The topology designer may use patterns to first express high level goals on a given set of elements in a topology and second to create topologies that include suitable configuration constructs that satisfy these high level goals. An example of such a pattern is a logical link that expresses a communication requirement on a database. To enable this communication requirement, an application server must be configured with a Datasource, a J2CAuth, and a JDBCProvider. However, it should be noted that the J2C Authentication and the JDBCProvider configurations are not illustrated.

Dependencies exist between these elements. For example, the Datasource must be configured with the name of the Database. This configuration expresses itself as a capability on the Datasource with a derived DatabaseName attribute and a dependency relationship to the database resource unit with an associated propagation rule. In addition, if an enterprise archive (EAR) and a database reside on two different OSs, then a DB2Client may be required on the OS running on the application server.

It should be noted that the pattern may apply either to a case where the application server resource within the topology or model represents an existing application server or to a case where the application server resource within the topology represents an application server that needs to be installed and started. In the first case where the application server resource within the topology represents an existing application server, the transformation logic may decide to reuse an existing configuration on the application server to achieve the configuration goal. The resolution rule, associated with the logical link, examines the topology and adds to the topology any necessary software modules and configuration elements to satisfy the goal.

Figure 8:
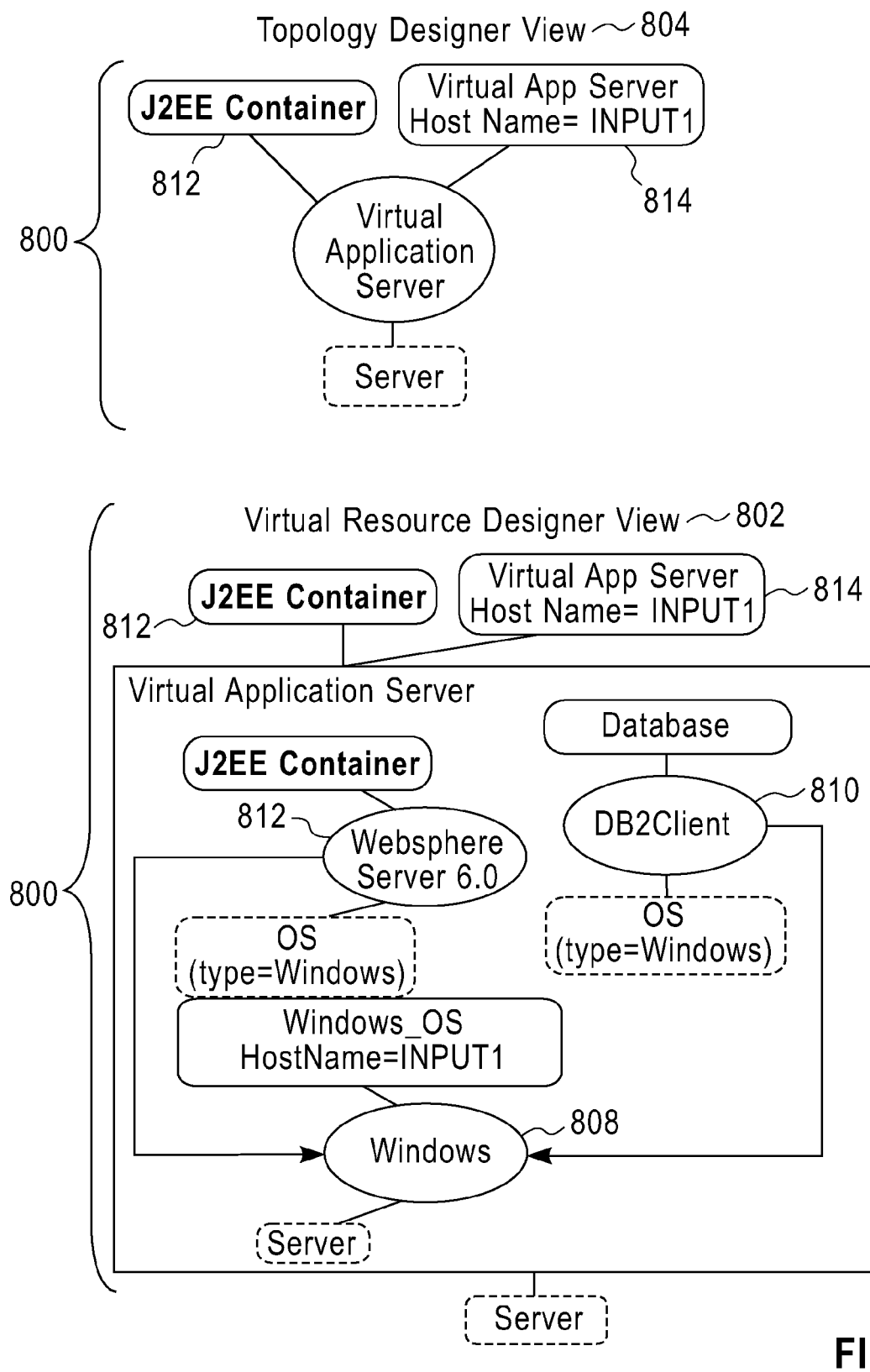
FIG. 8 is an exemplary illustration of a virtual application server resource definition in accordance with an illustrative embodiment.

With reference now to FIG. 8, an exemplary illustration of a virtual application server resource definition is depicted in accordance with an illustrative embodiment. Virtual resource definition 800 is a definition of a virtual resource, such as, for example, virtual resource definition 318 in FIG. 3. In addition, virtual resource definition 800 is a definition of a virtual application server. Virtual resource definition 800 includes two views that a user interface, such as, for example, user interface 308 in FIG. 3, may display to users, such as virtual resource designers and topology designers. Virtual resource designer view 802 provides a detailed view of virtual resource definition 800, whereas topology designer view 804 provides a simplified view of virtual resource definition 800.

Virtual resource designer view 802 shows a template topology that is part of the definition of virtual resource 800, which includes Websphere server 806, Windows 808, and DB2Client 810. This more detailed internal structure of virtual resource definition 800 is not exposed to the user in topology designer view 804. Therefore, the user viewing topology designer view 804 may not change any of the relationships or attributes of virtual resource definition 800. What is exposed in topology designer view 804 are two capabilities. The two exposed capabilities are J2EE container 812, which is the hosting capability, and virtual application server 814, which is a new basic virtual resource capability that is a place holder for the input parameter values.

One of the attributes, such as the host name on the OS, is exposed as an input parameter. When the user instantiates this virtual resource, the user is asked though the user interface to provide this input parameter. This input parameter is automatically propagated to the Windows 808 definition. It should be noted that in this case no special user interface code needs to be written. The structure is declaratively captured in the model. A propagation rule is defined based on the keyword INPUT and the identifier 1. The fact that the Windows 808 hosting capabilities and the DB2Client 810 hosting capabilities are not exposed in topology designer view 804 means that the user of the virtual resource has no control over installing software on the OS or configuring DB2Client 810. However, this does not mean that DB2Client 810 is not configured. DB2Client 810 is automatically configured based on user specification of high level goals in the level of abstraction of the virtual resource.

Figure 9:
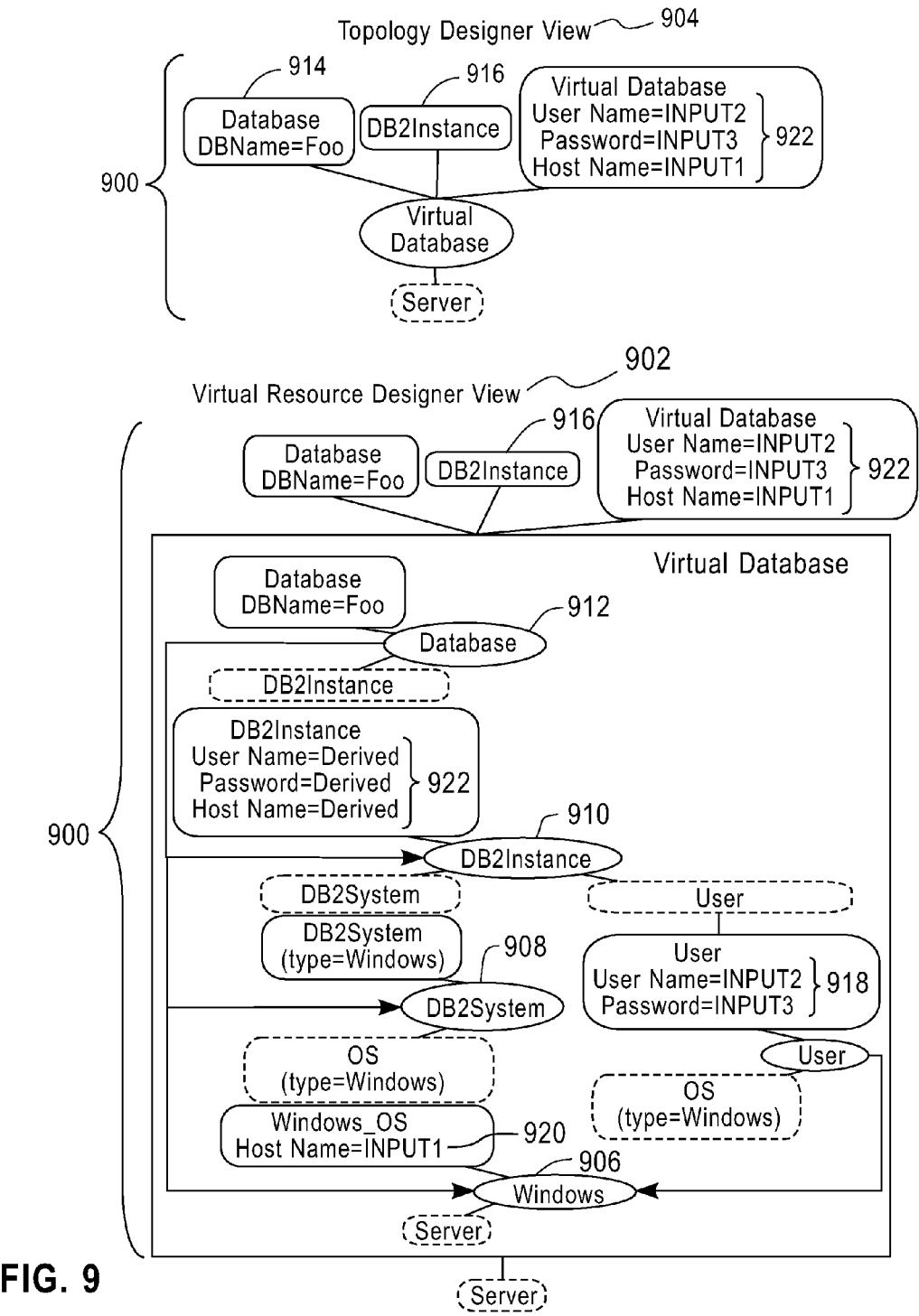
FIG. 9 is an exemplary illustration of a virtual database resource definition in accordance with an illustrative embodiment.

With reference now to FIG. 9, an exemplary illustration of a virtual database resource definition is depicted in accordance with an illustrative embodiment. Virtual resource definition 900 is a definition of a virtual resource, such as, for example, virtual resource definition 318 in FIG. 3. In addition, virtual resource definition 900 is a definition of a virtual database. Virtual resource definition 900 includes two views that a user interface, such as, for example, user interface 308 in FIG. 3, may display to users. Virtual resource designer view 902 shows a detailed view of virtual resource definition 900. Topology designer view 904 shows a simplified view of virtual resource definition 900.

Virtual resource definition 900 includes Windows 906, DB2System 908, DB2Instance 910, and Database 912. Virtual resource definition 900 exposes Database capability 914 and DB2Instance capability 916. This enables creating topologies that use the Database capability by connecting to it or that create new virtual databases by using the DB2Instance hosting capability.

Virtual resource definition 900 also exposes three inputs: username and password 918, which is required for the Windows User definition, and hostname 920, which is required for the OS. Virtual resource definition 900 inherits validation and resolution rules from the contained resources. In particular, the validation rule on the DB2Instance password is still enabled. The propagation rules also are enabled. Thus, username INPUT2, password INPUT3, and hostname INPUT1 922 are propagated to the DB2Instance definition.

The topology designer, or user, sees topology designer view 904, which is a simplified view of virtual resource 900, within the user interface. However, virtual resource designer view 902, which is a detailed view of the structure of the topology, is updated as a topology planning tool, such as, for example, topology planning tool 316 in FIG. 3, automatically invokes the resolution, or propagation, rules when the appropriate inputs are provided by the user. It is necessary to keep the virtual resource designer view 902 view of the topology because a provisioning automation component, such as, for example, provisioning automation component 306 in FIG. 3, consumes this view to automate the virtual resource life cycle, such as, for example, virtual resource life cycle 600 in FIG. 6.

Figure 10:
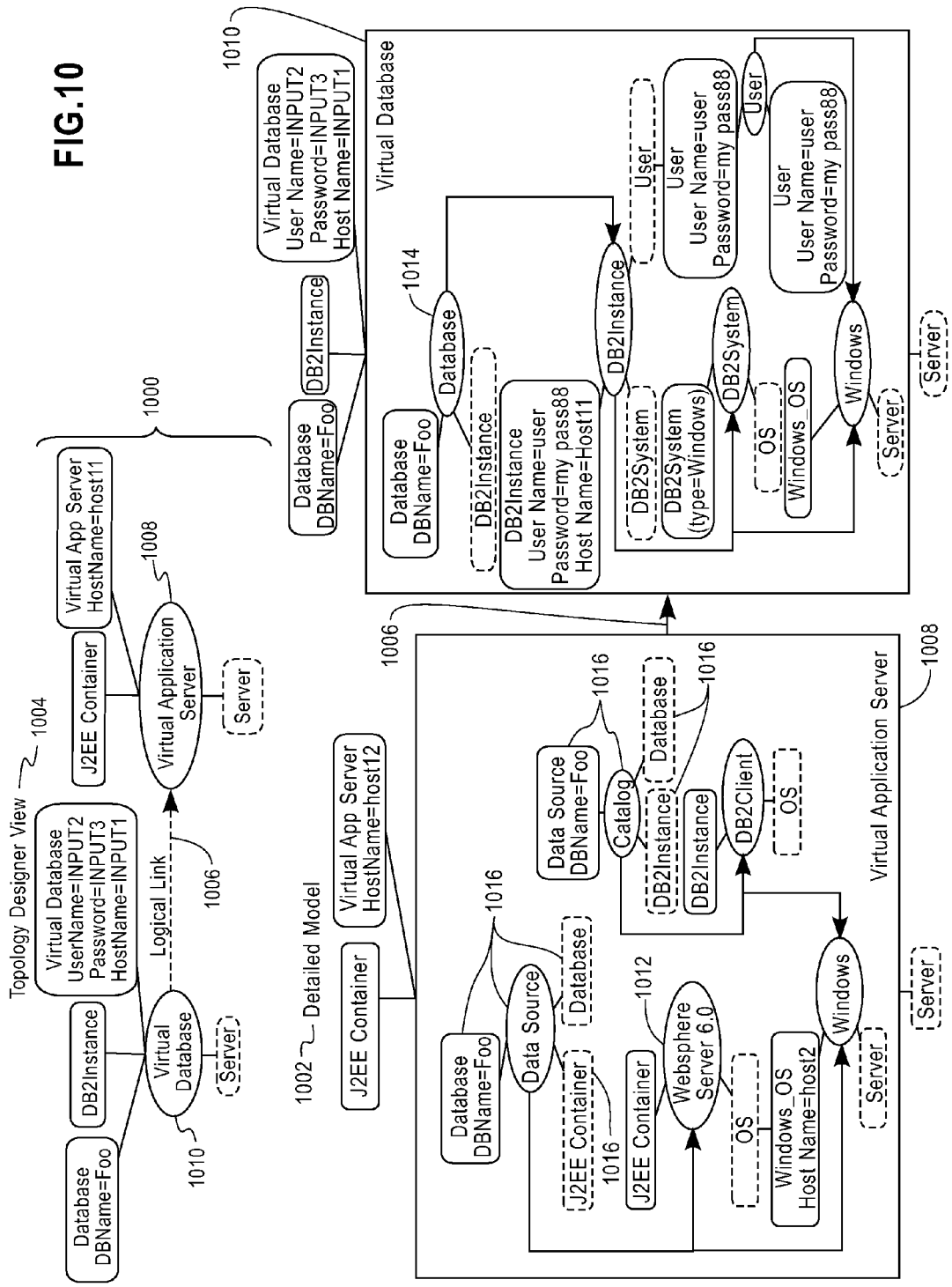
FIG. 10 is an exemplary illustration for creating a logical link between two virtual resource definitions in accordance with an illustrative embodiment.

With reference now to FIG. 10, an exemplary illustration for creating a logical link between two virtual resource definitions is depicted in accordance with an illustrative embodiment. FIG. 10 includes both detailed model 1002 and topology designer view 1004. Detailed model 1002 provides a detailed view of the internal structure of virtual resource 1000. Topology designer view 1004 provides a simplified view of virtual resource 1000.

Now that a virtual application server resource definition, such as virtual application server 800 in FIG. 8, and a virtual database resource definition, such as virtual database 900 in FIG. 9, are described above, a virtual resource designer may create a logical link, such as logical link 1006, between components of each of these virtual resource definitions. For example, the virtual resource designer creates logical link 1006 between virtual application server 1008 and virtual database 1010. More specifically, the virtual resource designer creates a logical link between Websphere server 1012, such as Websphere server 806 in FIG. 8, and Database 1014, such as Database 912 in FIG. 9.

The virtual resource designer may indicate the selection of logical link 1006, for example, through a user interface wizard or in an XML configuration file. Once this selection of logical link 1006 is manifested, logical link 1006 becomes part of the definition of virtual application server 1008 and virtual database 1010, which a topology planning tool, such as topology planning tool 316 in FIG. 3, uses to enable virtual resource topology constructions. For example, topology designer view 1004 presents the topology designer with a choice to create logical link 1006 between virtual application server 1008 and virtual database 1010. Once the topology designer creates logical link 1006 between these two virtual resource definitions, the topology planning tool automatically triggers any resolution rule associated with logical link 1006.

This automatic triggering of any resolution rules associated with logical link 1006, internally changes the structure of the virtual resource. While the topology designer does not see these internal changes to the structure of the virtual resource, detailed model 1002 keeps track of these internal changes. Later, a provisioning automation technology, such as provisioning automation component 306 in FIG. 3, consumes detailed model 1002 to instantiate virtual resource 1000.

The topology planning tool presents topology designer view 1004 to the topology designer to enable the topology designer to create logical link 1006 between virtual application server 1008 and virtual database 1010. The topology planning tool keeps internally detailed model 1002, such as, for example, detailed internal topology 506 in FIG. 5, and automatically generates the correct topology by executing all associated resolution rules. It should be noted that the topology designer provides the input parameters in the capabilities of the virtual resources and creates logical link 1006 within topology designer view 1004. The topology planning tool automatically triggers the associated propagation rules. Not only does the topology planning tool automatically propagate values to the places in the topology that the propagation values represent, such as, for example, the OS User resource, but also to the entire derived configuration, such as, for example, the User resource defined on the DB2Instance.

In addition, resolution of logical link 1006 creates objects 1016. It should be noted that objects 1016 are not part of the original definition of virtual application server 1008. Objects 1016 describe a configuration that needs to be added to virtual application server 1008 once the provisioning automation technology instantiates virtual resource 1000 to enable communication between virtual application server 1008 and virtual database 1010.

For example, if virtual application server 1008 is in a created state, such as created state 606 in FIG. 6, then virtual application server 1008 is associated with an image that contains a freeze dried stack of only the original elements of the definition of virtual application server 1008 and does not include objects 1016. If the topology designer decides to trigger the provisioning of the topology of virtual resource 1000, then detailed model 1002 is provided as input to the provisioning automation technology for consumption. The provisioning automation technology automates the instantiation of the relevant resources from the respective images, if the relevant resources are not already in an instantiated state, such as instantiated state 608 in FIG. 6. Also, the provisioning automation technology automatically configures the relevant resources based on detailed model 1002. Again, this whole internal process is hidden from the user. The user only sees simplified topology designer view 1004 and not detailed model 1002.

Figure 11:
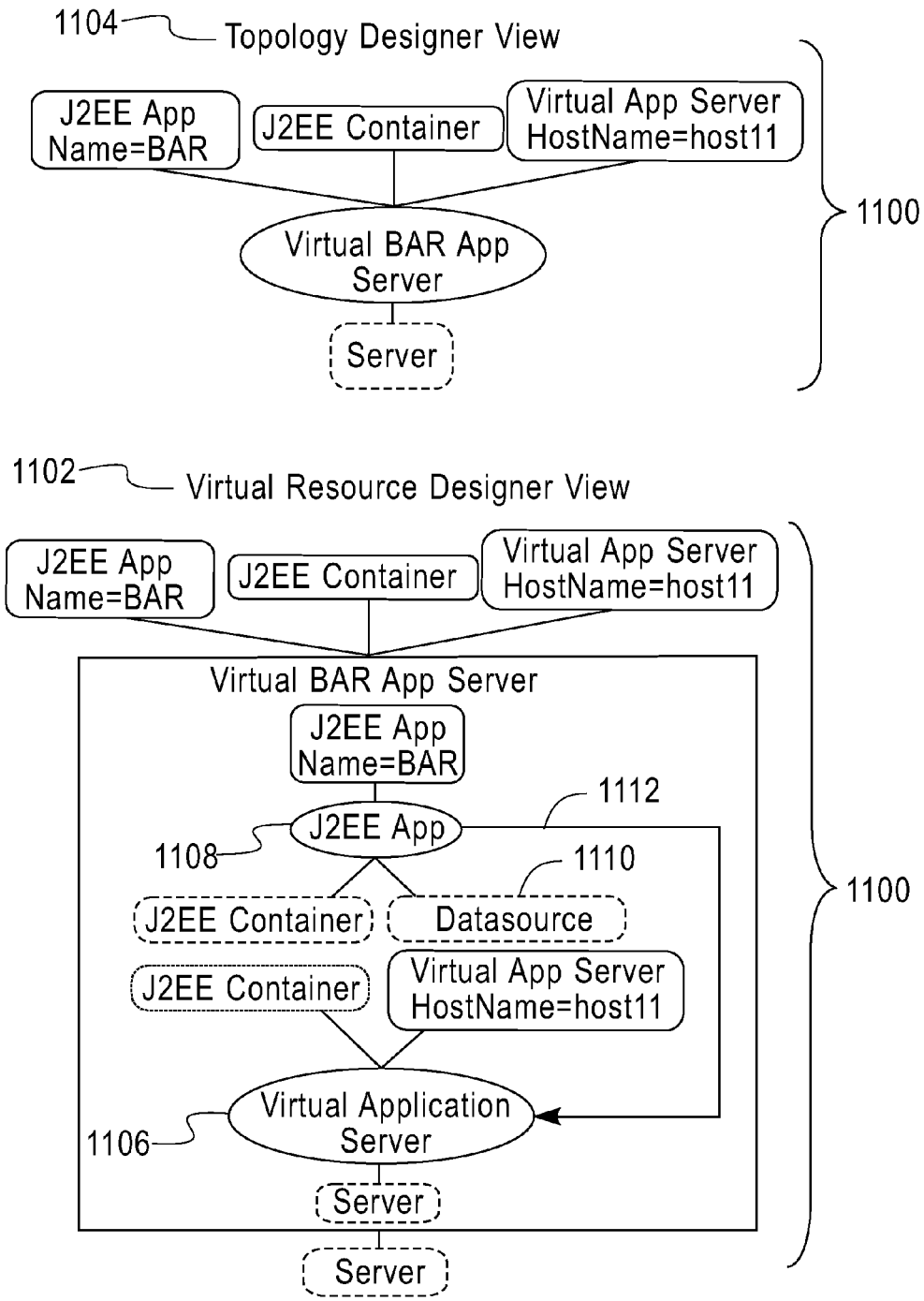
FIG. 11 is an exemplary illustration of an extension of a virtual resource in accordance with an illustrative embodiment.

With reference now to FIG. 11, an exemplary illustration of an extension of a virtual resource is depicted in accordance with an illustrative embodiment. FIG. 11 includes virtual resource designer view 1102 and topology designer view 1104. Virtual resource designer view 1102 provides a detailed view of virtual BAR application server 1100. Topology designer view 1104 provides a simplified view of virtual BAR application server 1100. It should be noted that in this particular example of FIG. 11, BAR represents the name of a JSEE application.

FIG. 11 demonstrates how a virtual resource designer may recursively use a virtual resource to define a larger virtual resource. In this particular example of FIG. 11, the virtual resource designer extends virtual application server 1106, such as, for example, virtual application server 800 in FIG. 8, with J2EE application 1108, which is packaged as an enterprise archive. Also, in this particular example, assume that J2EE application 1108 has a dependency on a datasource, such as Datasource 1110. In other words, this dependency means that J2EE application 1108 requires a database to correctly function.

Exposed J2EE application hosting capability 1112 of virtual application server 1106 is used. It should be noted that the virtual resource designer, again, is unaware of the internal structure of resources used to create virtual BAR application server 1100. In particular, the virtual resource designer is not aware of the type of virtual application server contained in virtual BAR application server 1100.

Figure 12:
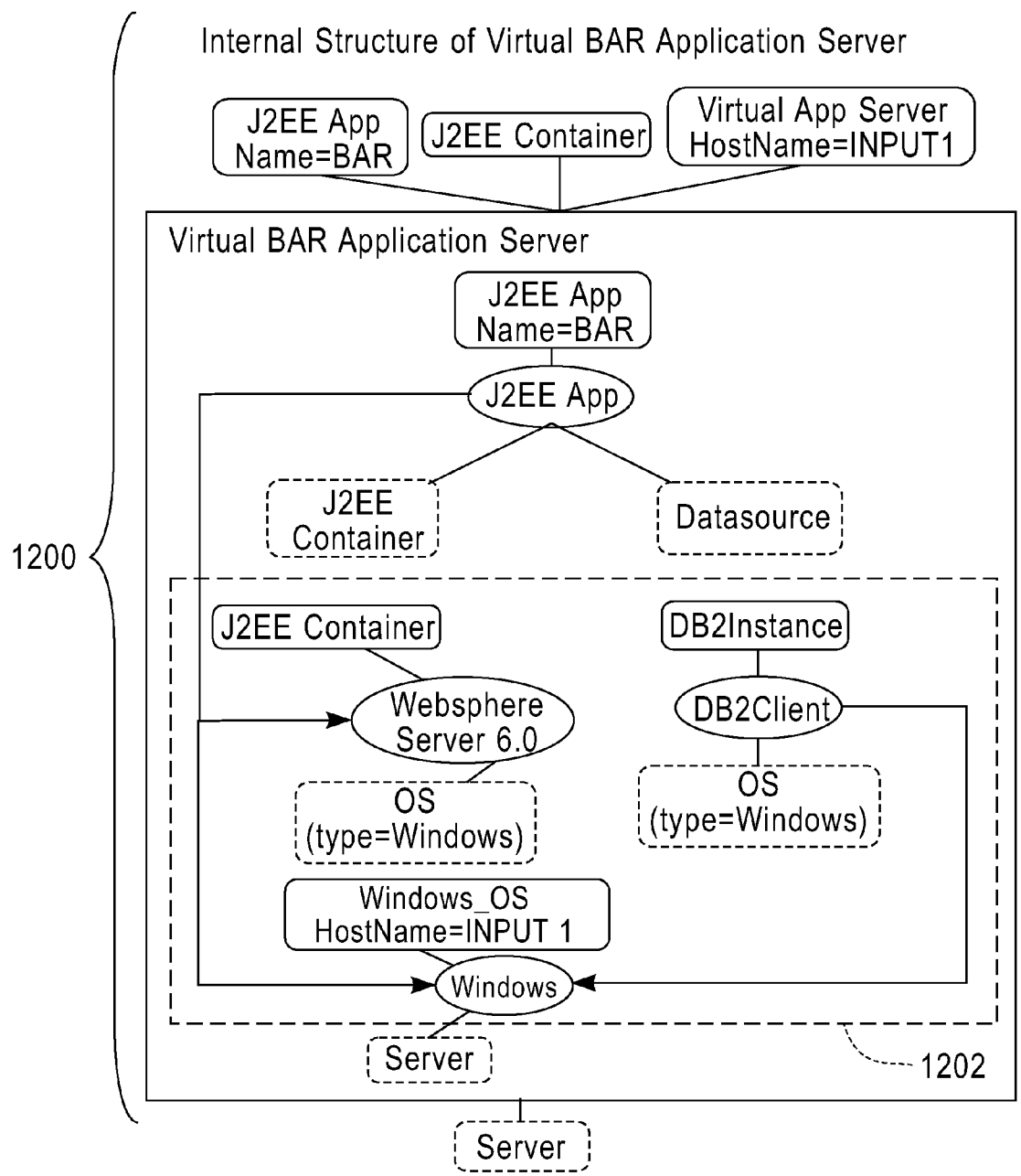
FIG. 12 is an exemplary illustration of the internal structure of the virtual BAR application server of FIG. 11 in accordance with an illustrative embodiment.

With reference now to FIG. 12, an exemplary illustration of the internal structure of the virtual BAR application server of FIG. 11 is depicted in accordance with an illustrative embodiment. Virtual BAR application server 1200 is a more detailed view of the internal structure of virtual BAR application server 1100 in FIG. 11. More specifically, the example of FIG. 12 shows elements 1202, which represent the internal structure of virtual application server 1106 in FIG. 11. Elements 1202 may, for example, comprise virtual application server 800 in FIG. 8.

Figure 13:
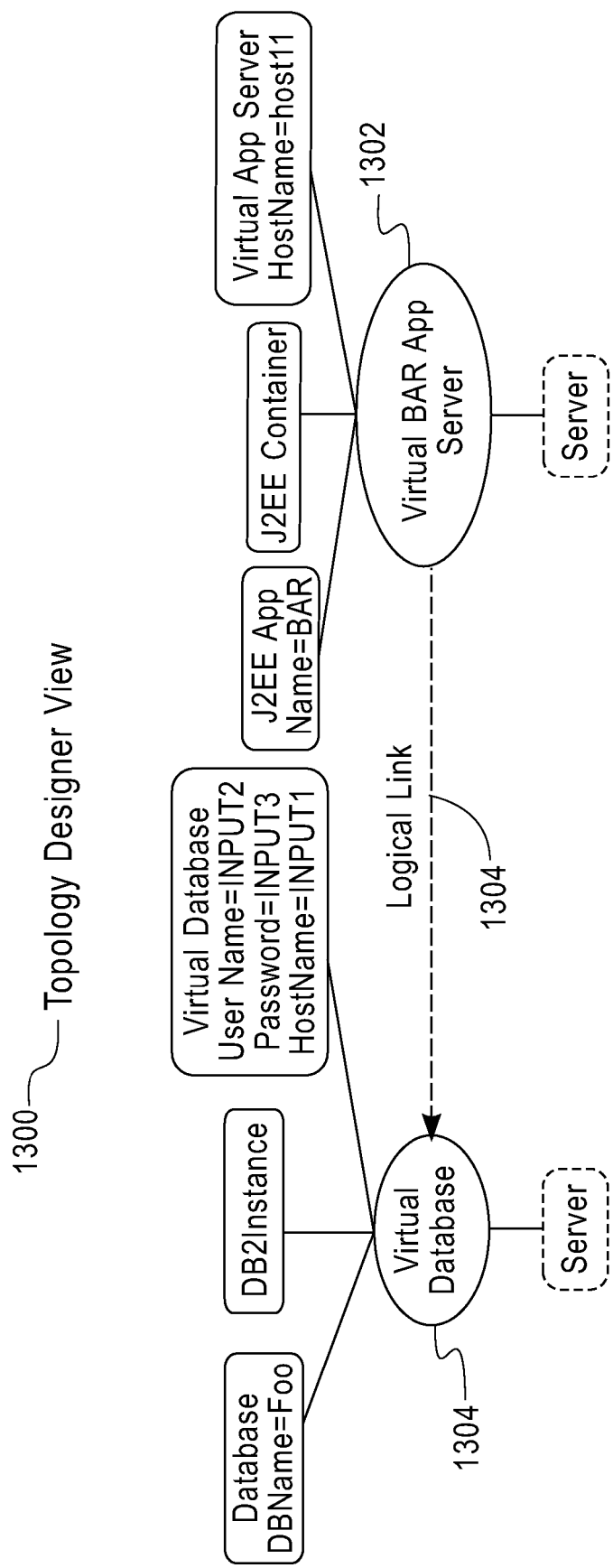
FIG. 13 is an exemplary illustration of a topology designer view for creating a logical link to satisfy a dependency requirement between two virtual resource definitions in accordance with an illustrative embodiment.

With reference now to FIG. 13, an exemplary illustration of a topology designer view for creating a logical link to satisfy a dependency requirement between two virtual resource definitions is depicted in accordance with an illustrative embodiment. Topology designer view 1300 provides a simplified view of virtual BAR application server 1302, such as, for example, virtual BAR application server 1100 in FIG. 11, and virtual database 1304, such as, for example, virtual database 900 in FIG. 9. A topology designer uses topology designer view 1300 to create logical link 1306 between virtual BAR application server 1302 and virtual database 1304.

The topology designer creates logical link 1306 because the J2EE application has an unsatisfied dependency requirement on a datasource, which was mentioned previously in the description of FIG. 11 above, in order to properly function. One way to handle this unsatisfied dependency requirement is for a virtual resource designer to expose a logical link between the enterprise archive and the database. By exposing the logical link, the virtual resource designer enables the topology designer to create a logical link between virtual BAR application server 1302 and virtual database 1304. Resolution rules associated with logical link 1306 add into the definitions of virtual BAR application server 1302 and virtual database 1304 the necessary configuration.

Figure 14:
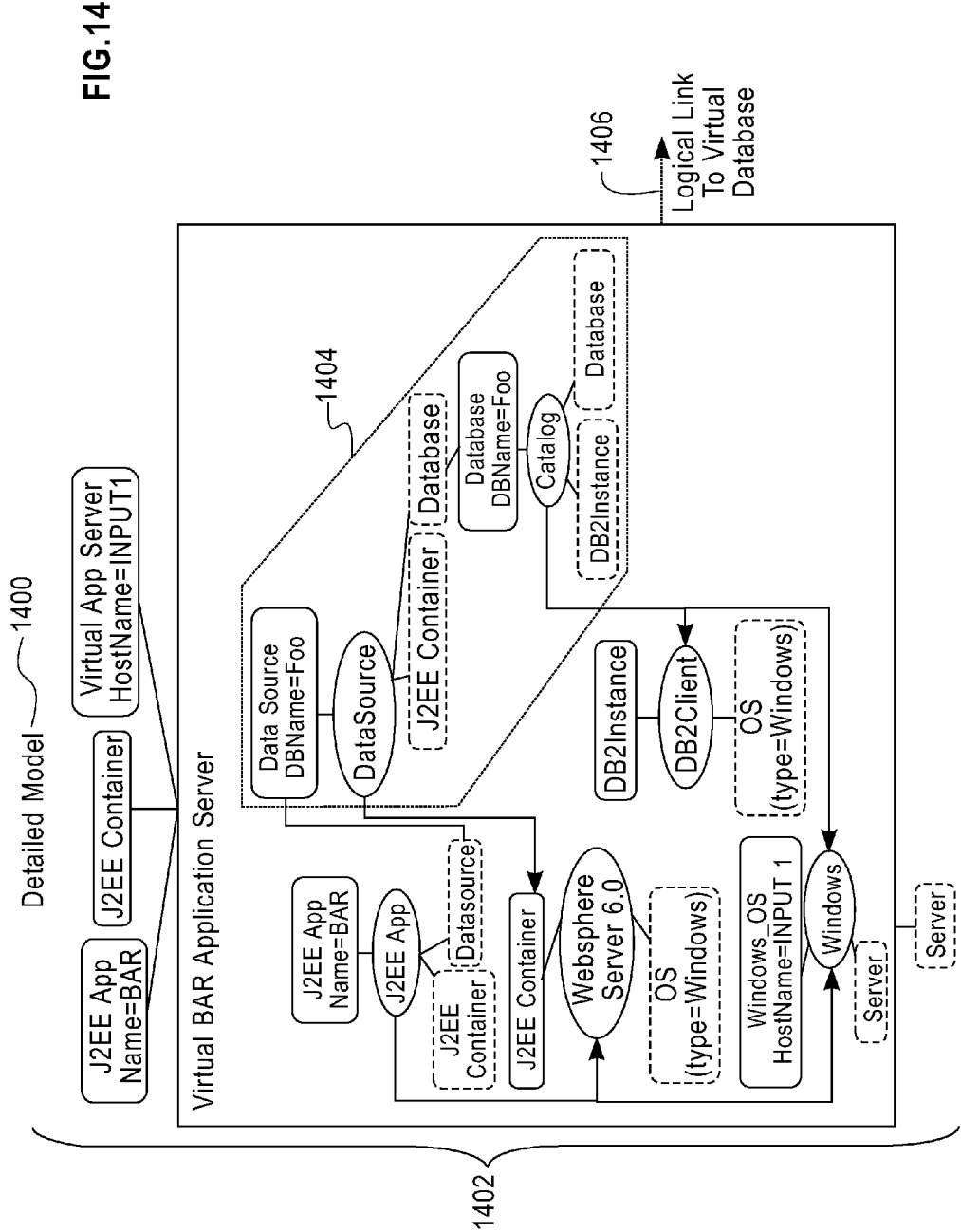
FIG. 14 is an exemplary illustration of the internal structure of the virtual BAR application server after resolution of the logical link created in FIG. 13 in accordance with an illustrative embodiment.

With reference now to FIG. 14, an exemplary illustration of the internal structure of the virtual BAR application server after resolution of the logical link created in FIG. 13 is depicted in accordance with an illustrative embodiment. Detailed model 1400 may, for example, be detailed model 1002 in FIG. 10. Detailed model 1400 provides a detailed view of the internal structure of virtual BAR application server 1402. In particular, the example of FIG. 14 shows objects 1404, It should be noted that objects 1404 are not part of the original definition of the virtual BAR application server, such as, for example, virtual BAR application server 1200 in FIG. 12. Objects 1404 describe a configuration that needs to be added to virtual BAR application server 1402 once the provisioning automation technology instantiates the entire virtual resource to enable communication between virtual BAR application server 1402 and a virtual database, such as virtual database 1304 in FIG. 13.

FIG. 14 shows the internal structure of virtual BAR application server 1402 after execution of the resolution rules associated with logical link 1406, such as, for example, logical link 1306 in FIG. 13. It should be noted that when the virtual resource designer created virtual BAR application server 1402, virtual BAR application server 1402 only contained a freeze dried stack of the original elements. However, in order to enable logical link 1406 once the provisioning automation technology instantiates the entire virtual resource, the provisioning automation technology automatically and transparently configures the logical link based on the detailed model containing objects 1404.

Another possibility is to include objects 1404 as part of the definition of virtual BAR application server 1402. In order to include objects 1404 as part of the definition of virtual BAR application server 1402, the virtual resource designer includes logical link 1406 in the definition of virtual BAR application server 1402. Resolution of logical link 1406 adds the necessary configuration to detailed model 1400 for virtual BAR application server 1402 and this extended definition for virtual BAR application server 1402 is packaged.

Now, when virtual BAR application server 1402 is created, virtual BAR application server 1402 contains the required configuration in the freeze dried software stack. It should be noted that in some cases, the virtual resource designer may want, or need, to look at and customize the internal structure of the virtual resources that the virtual resource designer used as building blocks for the entire structure. This customization of the internal structure of virtual resources is possible as a configurable policy. This customization function may be implemented, for example, by using groups that may be expanded and collapsed. When a group is expanded, the internal structure is exposed and may be customized. Thus, a user is allowed to work on an abstract level, use logical link resolutions both in the virtual resource design phase and the topology design phase, and customize the internal structure of virtual resources. However, it is expected that only expert virtual resource designers, and not topology designers, will customize the internal structure of the virtual resource definitions.

Figure 15:
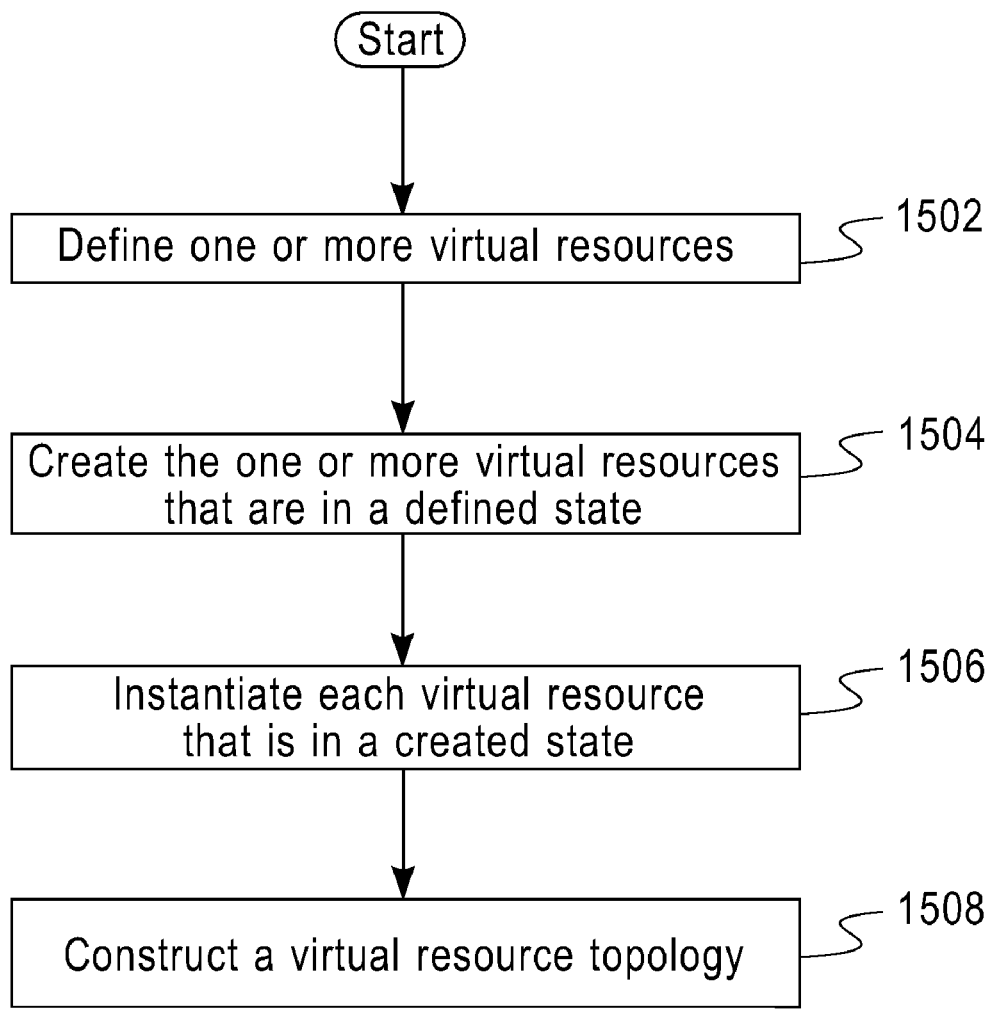
FIG. 15 is a flowchart illustrating an exemplary process for constructing a virtual resource in accordance with an illustrative embodiment.

With reference now to FIG. 15, a flowchart illustrating an exemplary process for constructing a virtual resource is shown in accordance with an illustrative embodiment. The process shown in FIG. 15 may be implemented in a data processing system, such as, for example, data processing system 300 in FIG. 3.

The process begins when a user, such as a virtual resource designer, utilizes a virtual resource design tool, such as, for example, virtual resource design tool 302 in FIG. 3, to define one or more new virtual resources based on user input (step 1502). The user may use existing virtual resource definitions and/or base resource definitions in the one or more virtual resource definitions. The one or more defined virtual resources are stored in an asset repository, such as, for example, asset repository 310 in FIG. 3.

Subsequent to defining the one or more virtual resources in step 1502, the user may utilize a provisioning automation technology, such as, for example, provisioning automation component 306 in FIG. 3, to create the one or more defined virtual resources (step 1504). The provisioning automation technology adds references to a set of images to the one or more defined virtual resources to create virtual resources. The created virtual resources are stored in an image repository, such as, for example, image repository 312 in FIG. 3.

After creating the one or more defined virtual resources in step 1504, the user utilizes the provisioning automation technology to instantiate each created virtual resource (step 1506). The instantiated virtual resources are correctly configured virtual resources based on user and environment inputs. The instantiated virtual resources are functional virtual resources and are stored in a data center, such as data center 304 in FIG. 3.

After instantiating each created virtual resource in step 1506, the user may use a topology planning tool, such as, for example, topology planning tool 316 in FIG. 3, to construct a new virtual resource topology (step 1508). It should be noted that while instantiated virtual resources are running, the running instantiated virtual resources may be connected to, or disconnected from, other virtual and base resources to form the new virtual resource topology. Thus, by utilizing illustrative embodiments a user may define, create, instantiate, and construct new virtual resources. FIGS. 16-19 below will more fully describe the defining, creating, instantiating, and constructing processes, respectively.

Figure 16:
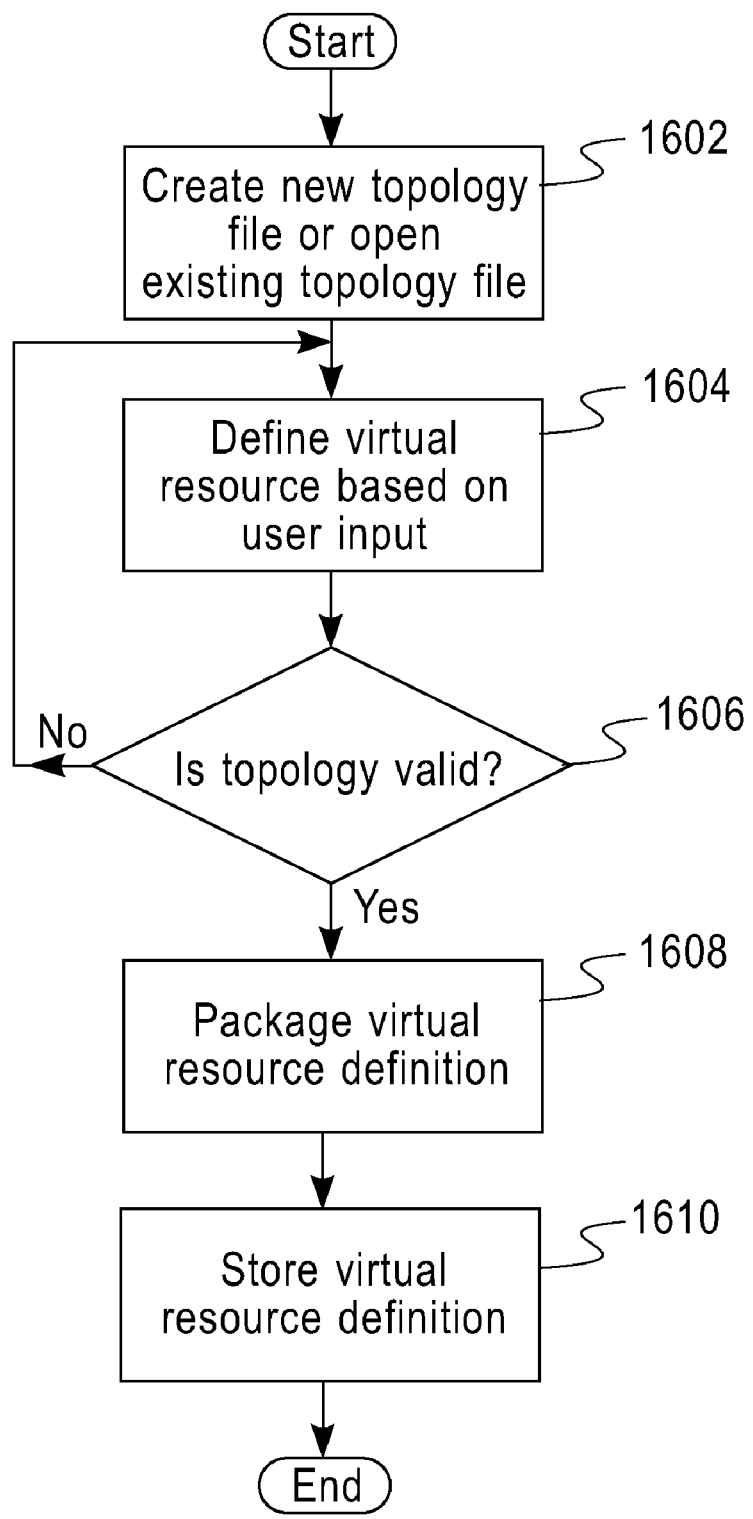
FIG. 16 is a flowchart illustrating an exemplary process for defining a virtual resource in accordance with an illustrative embodiment.

With reference now to FIG. 16, a flowchart illustrating an exemplary process for defining a virtual resource is shown in accordance with an illustrative embodiment. The process shown in FIG. 16 may be implemented in a virtual resource design tool, such as, for example, virtual resource design tool 302 in FIG. 3.

The process begins when a user, such as a virtual resource designer, utilizes the virtual resource design tool to generate a new virtual resource definition topology file or open an existing virtual resource definition topology file (step 1602). Subsequent to generating a new, or opening an existing, virtual resource definition topology file in step 1602, the virtual resource design tool defines the new virtual resource based on user input (step 1604). For example, the virtual resource design tool may utilize user input, such as dragging and dropping existing virtual and/or base resource definitions into the new virtual resource definition topology, creating relationships between objects in the new virtual resource definition topology, defining values of attributes, executing automatic resolution, defining exposed capabilities, defining input parameter variables for instantiation and runtime management, defining exposed relationships, selecting a sub-set of validation and resolution rules inherited from resources contained in the new resource definition topology, defining new validation and resolution rules, and defining or selecting an icon to graphically represent the new virtual resource definition, to define the new virtual resource.

After defining the new virtual resource based on the user input in step 1604, the virtual resource design tool makes a determination as to whether the new topology is valid (step 1606). The virtual resource design tool may, for example, employ a validation/resolution logic unit, such as validation/resolution logic unit 412 in FIG. 4, to determine if the new topology is valid. If the new topology is not valid, no output of step 1606, then the process returns to step 1604 where the virtual resource design tool defines the new virtual resource based on further user input. If the new topology is valid, yes output of step 1606, then the virtual resource design tool uses a packaging unit, such as, for example, packaging unit 406 in FIG. 4, to package the new virtual resource definition topology (step 1608). Subsequent to packaging the new virtual resource definition topology in step 1608, the virtual resource design tool stores the new virtual resource definition topology in an asset repository, such as, for example, asset repository 310 in FIG. 3 (step 1610). The process terminates thereafter.

Figure 17:
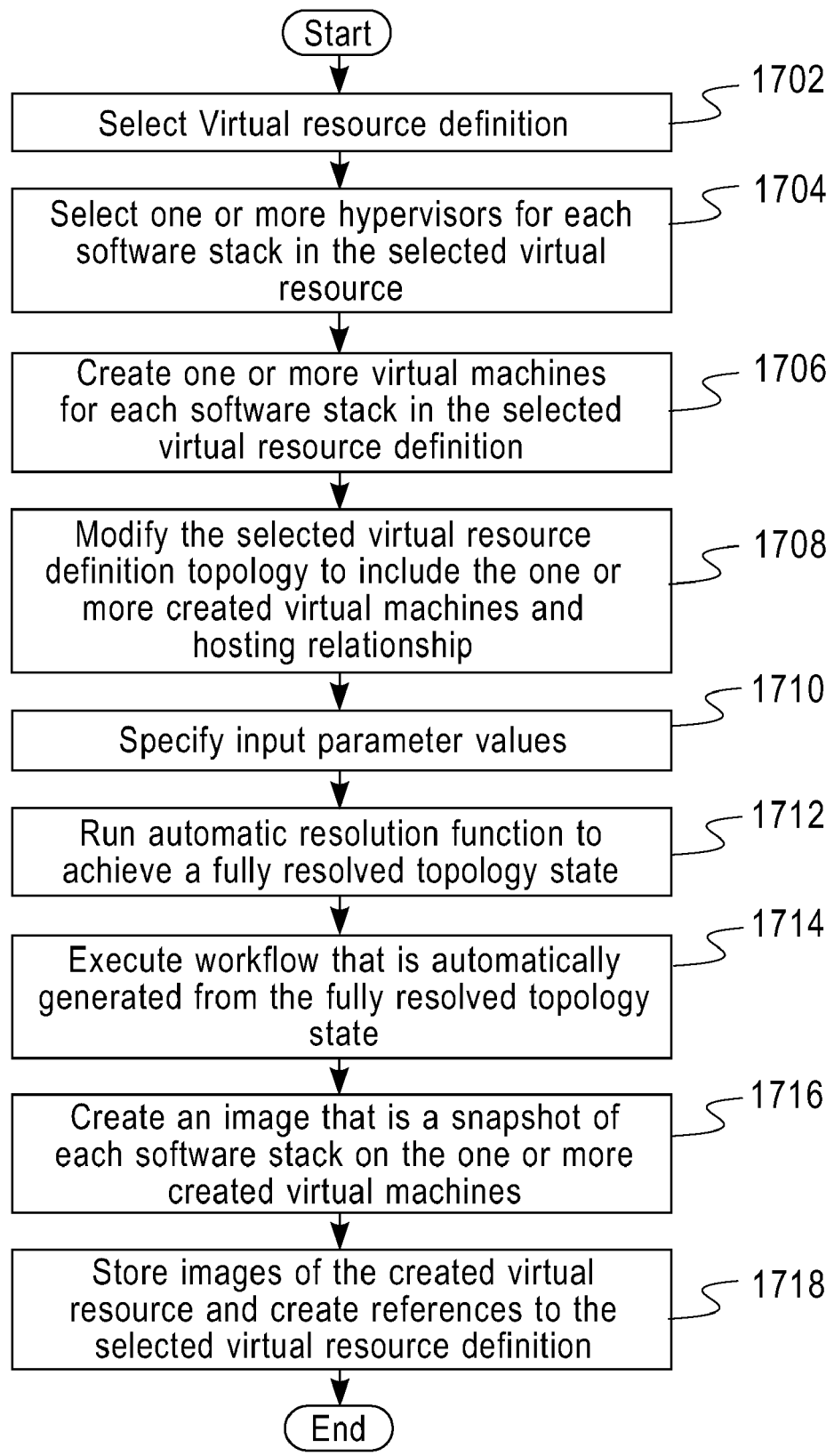
FIG. 17 is a flowchart illustrating an exemplary process for creating a virtual resource in accordance with an illustrative embodiment.

With reference now to FIG. 17, a flowchart illustrating an exemplary process for creating a virtual resource is shown in accordance with an illustrative embodiment. The process shown in FIG. 17 may be implemented in a provisioning automation technology, such as, for example, provisioning automation component 306 in FIG. 3.

The process begins when a user, such as a virtual resource designer, utilizes the provisioning automation technology to select a virtual resource definition from an asset repository, such as, for example, asset repository 310 in FIG. 3, for virtual resource creation (step 1702). Subsequent to the user selecting the virtual resource definition from the asset repository in step 1702, the user uses the provisioning automation technology to select one or more hypervisors for each software stack in the selected virtual resource definition (step 1704). The provisioning automation technology keeps a list of all available hypervisors. However, the user may need to check that each of the one or more hypervisors meet the requirements specified as part of the virtual resource definition.

After the user selects the one or more hypervisors for each software stack in the selected virtual resource definition in step 1704, the user uses the provisioning automation technology to create one or more virtual machines for each of the software stacks in the selected virtual resource definition (step 1706). Alternatively, the user may select one or more existing virtual machines. Subsequent to the user creating the one or more virtual machines for each of the software stacks in the selected virtual resource definition in step 1706, the provisioning automation technology modifies the selected virtual resource definition topology to include the one or more created virtual machines and a hosting relationship between a server requirement in the virtual resource definition and the virtual machine (step 1708). It should be noted that the virtual machine is modeled as a resource that provides a server capability. Step 1708 may, for example, be automatically performed by manipulating an XML file using functionality built into a virtual resource design tool, which may be called from a workflow without the use of a user interface. Then, the user utilizes the provisioning automation technology to specify input parameter values (step 1710). A wizard, for example, may be shown to the user to enter the user input parameter values. The provisioning automation technology uses these input parameter values to modify the topology in order to introduce variables of the virtual resource definition in the correct places.

After the user specifies the input parameter values in step 1710, the provisioning automation technology runs an automatic resolution function to achieve a fully resolved topology state, if necessary (step 1712). Subsequently, the provisioning automation technology executes a workflow that is automatically generated from the fully resolved topology state (step 1714). After executing the workflow in step 1714, the provisioning automation technology creates an image, which is a snapshot of each software stack, on the one or more created virtual machines (step 1716). Then, the provisioning automation technology stores the images of the created virtual resource in an image repository, such as, for example, image repository 312 in FIG. 3, and creates references to the selected virtual resource definition from the asset repository (step 1718). The process terminates thereafter.

Figure 18:
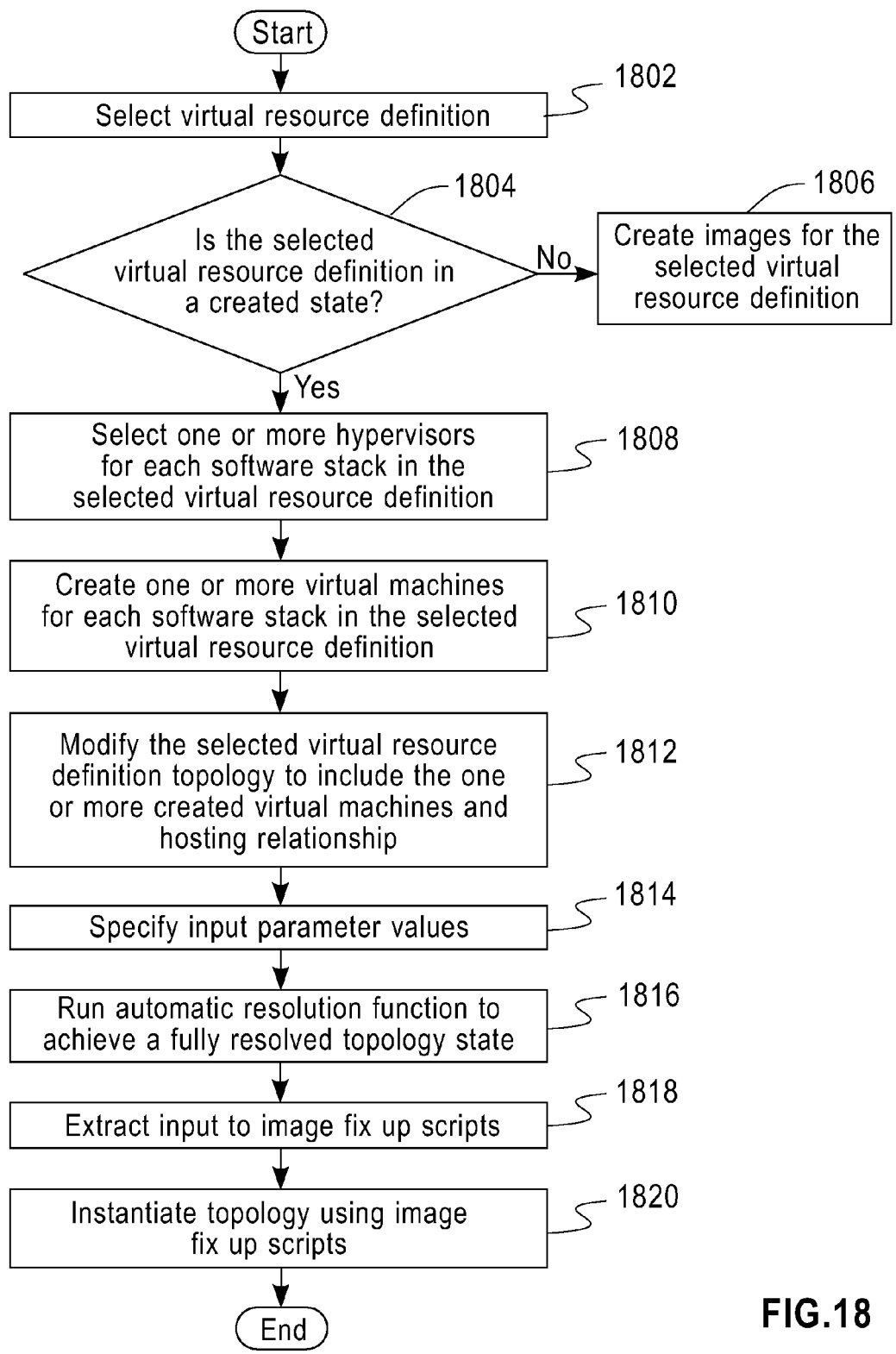
FIG. 18 is a flowchart illustrating an exemplary process for instantiating a virtual resource in accordance with an illustrative embodiment.

With reference now to FIG. 18, a flowchart illustrating an exemplary process for instantiating a virtual resource is shown in accordance with an illustrative embodiment. The process shown in FIG. 18 may be implemented in a provisioning automation technology, such as, for example, provisioning automation component 306 in FIG. 3.

The process begins when a user, such as a virtual resource designer, utilizes the provisioning automation technology to select a virtual resource definition for virtual resource instantiation (step 1802). Subsequent to the user selecting the virtual resource definition in step 1802, the provisioning automation technology makes a determination as to whether the selected virtual resource definition is in a created state, such as, for example, created state 606 in FIG. 6 (step 1804). If the selected virtual resource definition is not in a created state, no output of step 1804, then the provisioning automation technology creates images for the selected virtual resource definition (step 1806). Afterward, the process returns to step 1804.

If the selected virtual resource definition is in a created state, yes output of step 1804, then the user uses the provisioning automation technology to select one or more hypervisors for each software stack in the selected virtual resource definition (step 1808). After the user selects the one or more hypervisors for each software stack in the selected virtual resource definition in step 1808, the user uses the provisioning automation technology to create one or more virtual machines for each of the software stacks in the selected virtual resource definition (step 1810). Subsequent to the user creating the one or more virtual machines for each of the software stacks in the selected virtual resource definition in step 1810, the provisioning automation technology modifies the selected virtual resource definition topology to include the one or more created virtual machines and a hosting relationship (step 1812).

Then, the user utilizes the provisioning automation technology to specify input parameter values (step 1814). After the user specifies the input parameter values in step 1814, the provisioning automation technology runs an automatic resolution function to achieve a fully resolved topology state (step 1816). Subsequently, the provisioning automation technology extracts input to image fixup scripts (step 1818). The provisioning automation technology executes these fixup scripts as part of the image startup. These fixup scripts are responsible to make the necessary changes in the configuration of software components. These changes are necessary as the software components were configured with respect to different input and environment variables. Finally, the provisioning automation technology instantiates the virtual resource topology using the image fixup scripts (step 1820). The provisioning automation technology may, for example, store the instantiated virtual resource in a data center, such as data center 304 in FIG. 3. The process terminates thereafter.

Figure 19:
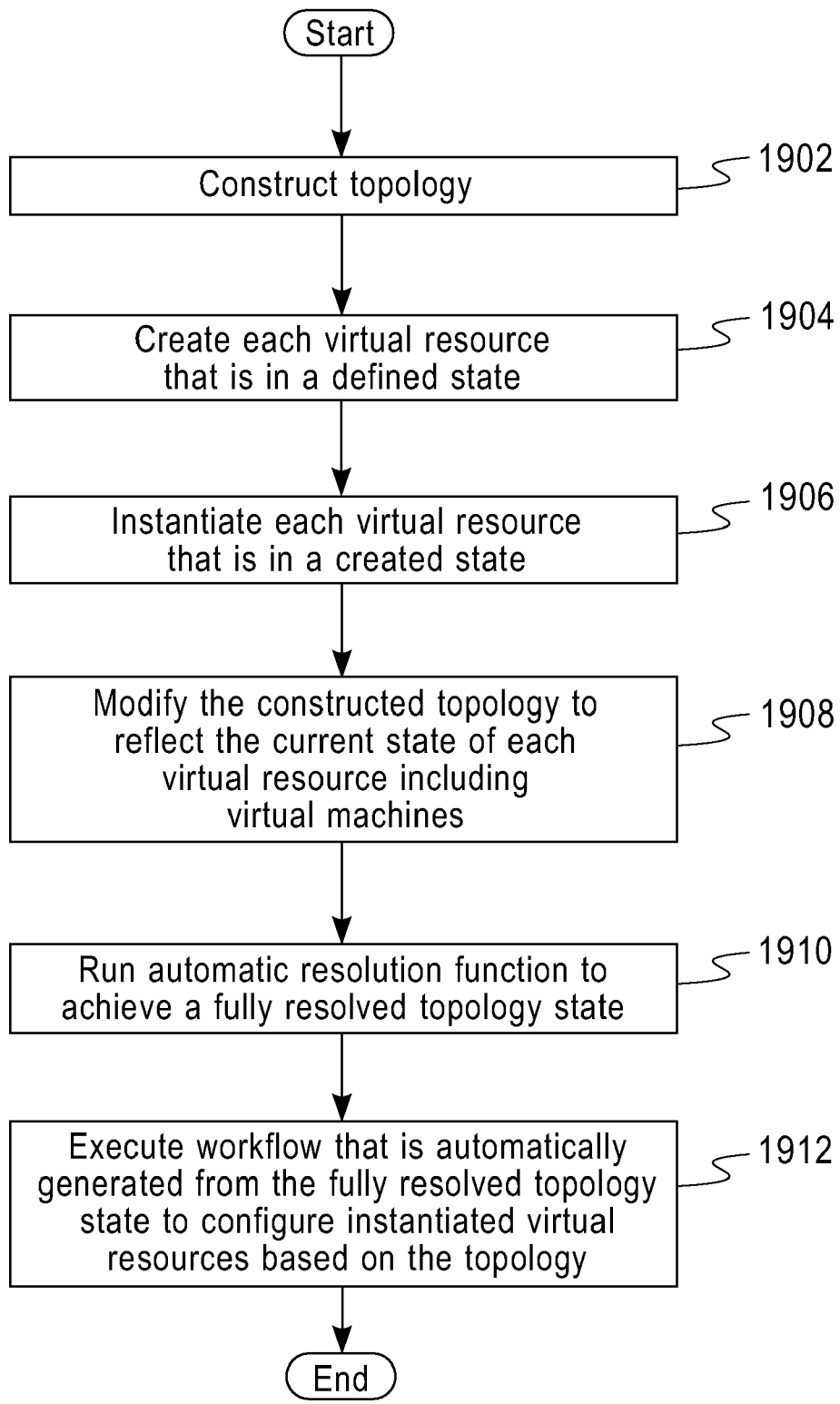
FIG. 19 is a flowchart illustrating an exemplary process for automatically affecting multiple changes in running virtual resources in accordance with an illustrative embodiment.

With reference now to FIG. 19, a flowchart illustrating an exemplary process for automatically affecting multiple changes in running virtual resources is shown in accordance with an illustrative embodiment. The process shown in FIG. 19 may be implemented in a topology planning tool, such as, for example, topology planning tool 316 in FIG. 3.

The process begins when a user, such as, for example, a topology designer, utilizes the topology planning tool to interactively construct a virtual resource topology (step 1902). The user may interactively construct the virtual resource topology by, for example, dragging and dropping existing virtual and/or base resources into the new virtual resource topology, creating relationships between objects in the new virtual resource topology, defining values of attributes, executing automatic resolution, defining exposed capabilities, defining input parameter variables, defining exposed relationships, selecting a sub-set of validation and resolution rules inherited from resources contained in the new resource topology, defining new validation and resolution rules, and defining or selecting an icon to graphically represent the new virtual resource topology.

Subsequent to constructing the virtual resource topology in step 1902, the user creates each virtual resource that is in a defined state, such as, for example, defined state 604 in FIG. 6 (step 1904). Afterward, the user instantiates each virtual resource that is in a created state, such as, for example, created state 606 in FIG. 6 (step 1906). Then, the topology planning tool modifies the constructed topology to reflect the current state of each virtual resource, which includes virtual machines (step 1908).

Subsequent to modifying the constructed topology in step 1908, the topology planning tool runs an automatic resolution function to achieve a fully resolved topology state (step 1910). After running the automatic resolution function in step 1910, the topology planning tool executes a workflow that is automatically generated from the fully resolved topology state to configure the instantiated virtual resources based on the topology (step 1912). The process terminates thereafter.

Thus, illustrative embodiments provide a computer implemented method, system, and computer usable program code for constructing virtual resources and managing the life cycle of those virtual resources. The invention may take the form of an entirely hardware embodiment, an entirely software embodiment, or an embodiment containing both hardware and software elements. In a preferred embodiment, the invention is implemented in software, which includes but is not limited to firmware, resident software, microcode, et cetera.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a life cycle of a virtual resource, the computer implemented method comprising:
    defining, by a computer, one or more virtual resources to form one or more defined virtual resources;
    creating, by the computer, the one or more defined virtual resources to form created virtual resources;
    instantiating, by the computer, the created virtual resources to form instantiated virtual resources;
    constructing, by the computer, a topology of a virtual resource using a plurality of virtual resources that are in at least one of a defined, a created, or an instantiated state to form a constructed topology;
    modifying, by the computer, the constructed topology;
    responsive to modifying the constructed topology, triggering, by the computer, execution of validation rules that correspond to modifications in the constructed topology, wherein the validation rules generate error markers when one or more of the validation rules are evaluated to false; and
    responsive to the one or more of the validation rules generating the error markers, triggering, by the computer, execution of resolution rules associated with the error markers recursively in a different order during each successive recursive cycle until all error markers are resolved to achieve a fully resolved topology, wherein resolution of the error markers changes the constructed topology and triggers another validation rule cycle.

2. The computer implemented method of claim 1, further comprising:
    executing a workflow that is automatically generated from the fully resolved topology to configure the instantiated virtual resources based on the constructed topology.

3. The computer implemented method of claim 1, further comprising:
    selecting one or more hypervisors for each software stack in the one or more defined virtual resources.

4. The computer implemented method of claim 1, further comprising:
    creating one or more virtual machines for each software stack in the one or more defined virtual resources.

5. The computer implemented method of claim 1, wherein the one or more defined virtual resources are defined by user input.

6. The computer implemented method of claim 1, wherein the one or more defined virtual resources inherit the validation rules and the resolution rules from resources contained within the one or more defined virtual resources.

7. The computer implemented method of claim 1, wherein the created virtual resources add references to a set of images to the one or more defined virtual resources.

8. The computer implemented method of claim 7, wherein the set of images includes one or more freeze dried software stacks.

9. The computer implemented method of claim 1, wherein the fully resolved topology describes a configuration that is functional and obtains all high level goals expressed by logical links.

10. The computer implemented method of claim 1, wherein a virtual resource design tool is used to define the one or more defined virtual resources.

11. The computer implemented method of claim 1, wherein a provisioning automation component is used to create the created virtual resources and to instantiate the instantiated virtual resources.

12. The computer implemented method of claim 11, wherein the provisioning automation component consumes the fully resolved topology to instantiate the constructed topology.

13. The computer implemented method of claim 1, wherein a topology planning tool is used to construct the constructed topology.

14. The computer implemented method of claim 13, wherein the topology planning tool presents each virtual resource as a single opaque object within a user interface.

15. The computer implemented method of claim 14, wherein the topology planning tool provides a simplified view of the constructed topology of the virtual resource to a user within the user interface and keeps internally a detailed model of the constructed topology of the virtual resource that the user does not see within the user interface.

16. The computer implemented method of claim 13, wherein the topology planning tool automatically determines how to create logical links between the instantiated virtual resources for establishing communication between the instantiated virtual resources.

17. The computer implemented method of claim 1, wherein the instantiated virtual resources are functional.

18. The computer implemented method of claim 1, wherein running instantiated virtual resources are connected to and unconnected from other resources to form a new virtual resource topology.

19. A data processing system for managing a life cycle of a virtual resource, comprising:
    a bus system;
    a storage device connected to the bus system, wherein the storage device stores a set of instructions; and
    a processing unit connected to the bus system, wherein the processing unit executes the set of instructions to;
    define one or more virtual resources to form one or more defined virtual resources;
    create the one or more defined virtual resources to form created virtual resources,
    instantiate the created virtual resources to form instantiated virtual resources;

construct a topology of a virtual resource using a plurality of virtual resources that are in at least one of a defined, a created, or an instantiated state to form a constructed topology;

modify the constructed topology;

trigger execution of validation rules that correspond to modifications in the constructed topology in response to modifying the constructed topology, wherein the validation rules generate error markers when one or more of the validation rules are evaluated to false; and trigger execution of resolution rules associated with the error markers recursively in a different order during each successive recursive cycle until all error markers are resolved to achieve a fully resolved topology in response to the one or more of the validation rules generating the error markers, wherein resolution of the error markers changes the constructed topology and triggers another validation rule cycle.

20. A computer program product stored on a computer readable storage medium having computer usable program code that is executable by a computer for managing a life cycle of a virtual resource, the computer program product comprising:

computer usable program code for defining one or more virtual resources to form one or more defined virtual resources;

computer usable program code for creating the one or more defined virtual resources to form created virtual resources;

computer usable program code for instantiating the created virtual resources to form instantiated virtual resources;

computer usable program code for constructing a topology of a virtual resource using a plurality of virtual resources that are in at least one of a defined, a created, or an instantiated state to form a constructed topology;

computer usable program code for modifying the constructed topology;

computer usable program code for triggering execution of validation rules that correspond to modifications in the constructed topology in response to modifying the constructed topology, wherein the validation rules generate error markers when one or more of the validation rules are evaluated to false; and computer usable program code for triggering execution of resolution rules associated with the error markers recursively in a different order during each successive recursive cycle until all error markers are resolved to achieve a fully resolved topology in response to the one or more of the validation rules generating the error markers, wherein resolution of the error markers changes the constructed topology and triggers another validation rule cycle.

* * * * *